(12) United States Patent
Kikuchi et al.

(10) Patent No.: US 7,785,495 B2
(45) Date of Patent: Aug. 31, 2010

(54) ELECTRIC DOUBLE-LAYER CAPACITOR

(75) Inventors: Taketoshi Kikuchi, Ibaraki (JP); Tamon Itahashi, Tokyo (JP)

(73) Assignee: Sumitomo Chemical Company, Limited, Tokyo (JP)

(*) Notice: Subject to any disclaimer, the term of this patent is extended or adjusted under 35 U.S.C. 154(b) by 415 days.

(21) Appl. No.: 11/920,344

(22) PCT Filed: May 24, 2006

(86) PCT No.: PCT/JP2006/310832
§ 371 (c)(1),
(2), (4) Date: Nov. 14, 2007

(87) PCT Pub. No.: WO2006/126721
PCT Pub. Date: Nov. 30, 2006

(65) Prior Publication Data
US 2009/0103241 A1 Apr. 23, 2009

(30) Foreign Application Priority Data

May 27, 2005 (JP) ............... 2005-155167
Jul. 1, 2005 (JP) ............... 2005-194143
Jul. 1, 2005 (JP) ............... 2005-194144

(51) Int. Cl.
*H01B 1/00* (2006.01)

(52) U.S. Cl. ............ 252/500; 252/62.54; 252/502; 29/623.5; 525/502; 548/435

(58) Field of Classification Search ............ 252/62.54, 252/500; 29/623.5; 525/502; 548/435
See application file for complete search history.

(56) References Cited

U.S. PATENT DOCUMENTS

| | | | |
|---|---|---|---|
| 4,048,715 A * | 9/1977 | Vissers et al. ............ 29/623.5 |
| 4,873,218 A | 10/1989 | Pekala |
| 5,026,871 A * | 6/1991 | Southcott ............ 548/435 |
| 5,135,673 A * | 8/1992 | Murata et al. ............ 252/62.54 |
| 5,439,989 A * | 8/1995 | Morton et al. ............ 525/502 |
| 5,789,338 A | 8/1998 | Kaschmitter et al. |
| 5,945,084 A | 8/1999 | Droege |
| 2002/0096661 A1* | 7/2002 | Shinozaki et al. ........ 252/500 |

FOREIGN PATENT DOCUMENTS

| | | |
|---|---|---|
| EP | 1 142 831 A1 | 10/2001 |
| EP | 1 876 611 A1 | 1/2008 |
| JP | 2001-284188 A | 10/2001 |
| JP | 2003-203829 A | 7/2003 |
| JP | 2006-160597 A | 6/2006 |
| JP | 2006-188366 A | 7/2006 |
| WO | WO-93/14511 A1 | 7/1993 |

OTHER PUBLICATIONS

Gao, Mengjiao, "The Study of Calixarene Membrane Electrode," School of Chemistry and Chemical Engineering, Shanghai University, 37(1), 2001, pp. 7-9.*

K. Murate, "Preparation of carbon powders by pyrolysis of graphitizable and non-graphitizable polymers under argon stream and their magnetic properties," Natl. Chem. Lab., 32(3), 1991, pp. 189-190.*

European Search Report issued on Feb. 11, 2010 in corresponding European Patent Application No. 06 75 6780.

Murata K. et al., "Formation of Carbon Powders by Pyrolysis of Organic Polymers (Origomers) and Their Magnetic Behaviors. III. Pyrolysis of Resorcinol-Aldehyde Cyclic Tetramers and Phenol-Formaldehyde Resin in the Absence of Activated Carbon", Chemistry Express. vol. 5, No. 8, pp. 605-608, 1990, Kinki Chemical Society, Japan.

Feng-Chin Wu et al., Physical and electrochemical characterization of activated carbons prepared from firwoods for supercapacitors, Journal of Power Sources, 138, 2004, pp. 351 to 359.

* cited by examiner

*Primary Examiner*—Mark Kopec
*Assistant Examiner*—Khanh Tuan Nguyen
(74) *Attorney, Agent, or Firm*—Birch, Stewart, Kolasch & Birch, LLP

(57) ABSTRACT

An activated carbon comprising a carbonized and activated compound represented by the formula (1):

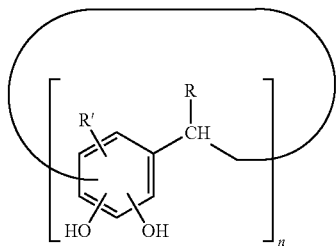

(1)

(wherein, R represents a hydrocarbon group having 1 to 12 carbon atoms, said hydrocarbon group may be optionally substituted with hydroxyl group, alkyl group, alkoxy group, aryl group, aryloxy group, sulfonyl group, halogen atoms, nitro group, thioalkyl group, cyano group, carboxyl group, amino group or amide group, R' represents hydrogen atom or methyl group, and n represents an integer of 4, 6, or 8).

15 Claims, 2 Drawing Sheets

ELECTRIC DOUBLE-LAYER CAPACITOR

FIELD OF THE INVENTION

The present invention relates to electric double-layer capacitors.

BACKGROUND OF THE INVENTION

Currently, electric energy-storage devices having large capacity are required in the fields such as midnight-power storage and auxiliary power supplies for power failure. Electric energy-storage devices having large capacity per unit volume, that is, having abilities of supplying power for long duration in spite of the small size thereof, are also required in the field of transportation vehicles characterized by battery-powered driving force such as battery-powered electric vehicles and hybrid electric vehicles and in the field of portable electric terminals such as mobile personal computers, cellular phones and portable audio devices.

Electric double-layer capacitors are expected as an electric energy-storage device, which are composed of an electrode, a separator and an electrolytic solution and store electric power in a boundary surface (electric double-layer) formed between an electrolyte and an electrode due to absorption of the electrolyte dissolved in an the electrolytic solution to the electrode. The capacity of stored energy is defined by the formula $\frac{1}{2} \cdot C \cdot V^2$ (wherein C is electrostatic capacity (F) and V is voltage), therefore in order to store more energy, the electrostatic capacity of electric energy-storage devices must be enhanced, especially in order to store more energy in compact volume, enhancement of electrostatic capacity per unit volume is required.

Activated carbons are commonly used for the electrode of electric double-layer capacitors, specifically included is an activated carbon having micropores (20 Å or less of pore diameter) as major pores thereof which is obtained by carbonizing and activating palm shell and the like.

Recently, an activated carbon having meso-pores as major pores thereof is disclosed which is produced by polymerizing resorcinol with formaldehyde in the presence of a basic catalyst and an aqueous solvent to obtain an organic aerogel uniformly having meso-pores (20 Å or more of pore diameter), washing the organic aerogel with an organic solvent, replacing the aqueous solvent to the organic solvent, drying and then carbonizing, and can be used for the electrode of electric double-layer capacitor (U.S. Pat. No. 4,873,218), however, the electric double-layer capacitor does not have sufficient electrostatic capacity per unit weight.

It is also reported in Chemistry Express, Vol. 5, No. 8, pp. 606-608 (1990) (KAZUHISA MURATA, TAKASI MASUDA, AND HISASI UEDA) that a cyclic tetramer which is a polymer of resorcinol and an aldehyde compound can be carbonized, however the electrostatic capacity given by the carbonized material is not sufficient.

The inventors of the invention have studied about activated carbons capable of giving electric double-layer capacitors having large electrostatic capacity, and found that an electric double-layer capacitor having an electrode which contains an activated carbon obtained by carbonizing a cyclic polymer of resorcinols and an aldehyde compound can exhibit a sufficient electrostatic capacity as expected.

DISCLOSURE OF THE INVENTION

The object of the present invention is to provide an activated carbon giving an electrode suitable to an electric double-layer capacitor having enhanced electrostatic capacity.

That is, the invention provides the following [1] to [20] aspects.

[1] An activated carbon comprising a carbonized and activated compound represented by the formula (1):

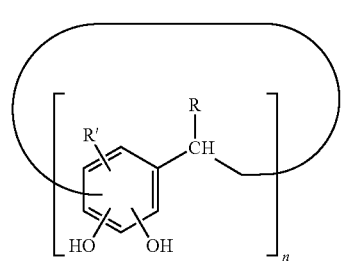

(wherein, R represents a hydrocarbon group having 1 to 12 carbon atoms, said hydrocarbon group may be optionally substituted with hydroxyl group, alkyl group, alkoxy group, aryl group, aryloxy group, sulfonyl group, halogen atoms, nitro group, thioalkyl group, cyano group, carboxyl group, amino group or amide group, R' represents hydrogen atom or methyl group, and n represents an integer of 4, 6, or 8).

[2] The activated carbon according to [1], wherein R' of the compound (1) is hydrogen atom.

[3] The activated carbon according to [1] or [2], wherein the activated carbon has a total pore volume of less than 0.95 ml/g.

[4] The activated carbon according to any one of [1] to [3], wherein the activated carbon has an alkali metal component or alkaline earth metal component in the amount of 100 ppm or less.

[5] A method for producing an activated carbon comprising carbonizing and activating the compound represented by the formula (1) according to [1].

[6] The method according to [5], wherein said carbonization and activation comprise calcining at a temperature of 200 to 1500° C. in the presence of an oxidative gas.

[7] The method according to [5] or [6], wherein said carbonization and activation comprise calcining at a temperature of 200 to 1500° C. under an atmosphere of an inactive gas to carbon, and then further calcining at a temperature of 200 to 1500° C. in the presence of an oxidative gas.

[8] The method according to any one of [5] to [7], wherein said carbonization and activation comprise calcining at 400° C. or less in the presence of an oxidative gas, calcining at 1500° C. or less under an atmosphere of an inactive gas to carbon, and then further calcining at 200 to 1500° C. in the presence of $H_2O$ or $CO_2$.

[9] An electrode comprising the activated carbon according to any one of [1] to [4].

[10] The electrode according to [9], wherein R' of the compound (1) is hydrogen atom.

[11] The electrode according to [9] or [10], wherein the activated carbon has a total pore volume of less than 0.95 ml/g.

[12] The electrode according to any one of [9] to [11]), wherein the activated carbon has an alkali metal component or alkaline earth metal component in the amount of 100 ppm or less.

[13] An electric double-layer capacitor comprising the electrode according to any one of [9] to [12].

[14] The electric double-layer capacitor according to [13] further comprising a separator and an electrolytic solution.

[15] The electric double-layer capacitor according to [14], wherein the separator is at least one selected from the group consisting of papermakings, electrolytic papers, kraft papers, manila papers, mixed papermakings, polyethylene non-woven fabrics, polypropylene non-woven fabrics, polyester non-woven fabrics, Manila hemp sheets and glass fiber sheets.

[16] The electric double-layer capacitor according to [14] or [15], wherein the electrolytic solution is an aqueous solution of sulfuric acid.

[17] The electric double-layer capacitor according to any one of [14] to [16], wherein the electrolytic solution comprises an organic quaternary cation, an inorganic anion and an organic polar solvent.

[18] An electric double-layer capacitor comprising an electrode and an electrolytic solution, wherein said electrode contains an activated carbon having a content of an alkali metal component or alkaline earth metal component of 100 ppm or less and a total pore volume of less than 0.95 ml/g, and said electrolytic solution contains an organic quaternary cation, an inorganic anion and an organic polar solvent, and the electrostatic capacity per unit volume of said activated carbon is 15 F/ml or more.

[19] The electric double-layer capacitor according to [18], wherein the electrostatic capacity per unit weight of the activated carbon is 18 F/g or more.

[20] The electric double-layer capacitor according to [18] or [19], wherein the electrostatic capacity per unit weight of the activated carbon is 19 F/g or more.

Figure 1:
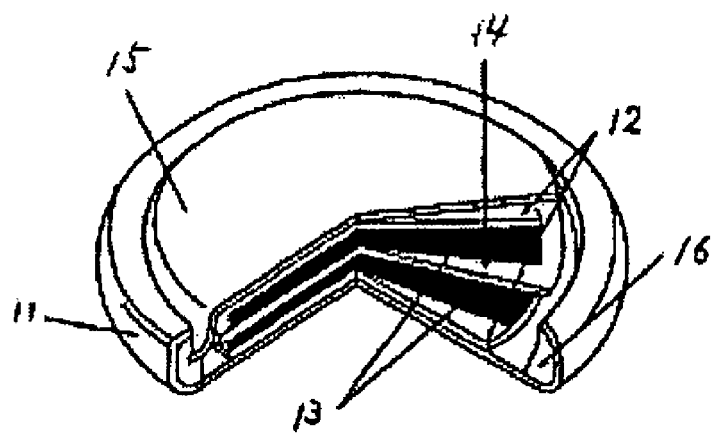
FIG. 1 is a schematic diagram of one embodiment of a coin-shaped electric double-layer capacitor.

Each of numerals referred in the drawings denotes the corresponding terms respectively as listed below.

| | |
|---|---|
| 11: | Metallic case |
| 12: | Current collector |
| 13: | Electrode |
| 14: | Separator |
| 15: | Metallic lid |
| 16: | Gasket |
| 21: | Metallic case |
| 22: | Current collector |
| 23: | Electrode |
| 24: | Separator |
| 25: | Electrode sealing pad |
| 26: | Lead |
| 31: | Metallic case |
| 32: | Current collector |
| 33: | Electrode |
| 34: | Separator |
| 35: | Lead |
| 36: | Terminal |
| 37: | Safety valve |
| 41: | Pressure plate and terminal |
| 42: | Current collector |
| 43: | Electrode |
| 44: | Separator |
| 46: | Gasket |
| 51: | Pressure plate |
| 52: | Current collector |
| 53: | Electrode |
| 54: | Separator |
| 55: | Insulating material |

MODE FOR CARRYING OUT THE INVENTION

The invention is explained in more detail as follows.

The activated carbon used in the present invention is an activated carbon in which a compound represented by the formula (1) is carbonized, or carbonized and activated.

In the formula (1), R represents a hydrocarbon group having 1 to 12 carbon atoms, and the hydrocarbon group may be optionally substituted with hydroxyl group, alkyl group, alkoxy group, aryl group, aryloxy group, sulfonyl group, halogen atoms, nitro group, thioalkyl group, cyano group, carboxyl group, amino group or amide group.

The hydrocarbon group having 1 to 12 carbon atoms includes, for example, alkyl groups such as methyl group, ethyl group, and butyl group; cycloalkyl groups such as cyclohexyl group; and aromatic groups such as phenyl group and naphthyl group. The hydrocarbon group coupled with the substitution groups mentioned above includes, for example, aromatic groups substituted with alkyl group such as 2-tolyl group, 3-tolyl group, and 4-tolyl group; and aromatic groups substituted with hydroxyl group such as 2-hydroxybenzyl group, 3-hydroxybenzyl group, and 4-hydroxybenzyl group. Among of them, in view of yields in carbonization processing, preferable are aromatic groups optionally substituted with the groups mentioned above, and more preferable being aromatic groups optionally substituted with hydroxyl group and alkyl group.

In the formula (1), R' represents hydrogen atom or methyl group, and preferably being hydrogen atom in view of easiness of production.

In the formula (1), n represents a numeral of 4, 6, or 8, and preferably being 4 in view of easiness of production.

The hydroxyl groups coupled together with R' to the benzene ring of the formula (1) are usually bound to the ortho- and para-positions relative to the position bound by a group of —CH(R)—.

The compound (1) has stereoisomers, and may be constituted with any one of the stereoisomers or a mixture thereof.

When the compound (1) is produced by using an acid catalyst as mentioned hereinafter, it will be usually a mixture of the stereoisomers.

As the specific examples of the compound (1), included is a compound represented by the following formula. Herein, R includes groups exemplified in the right box.

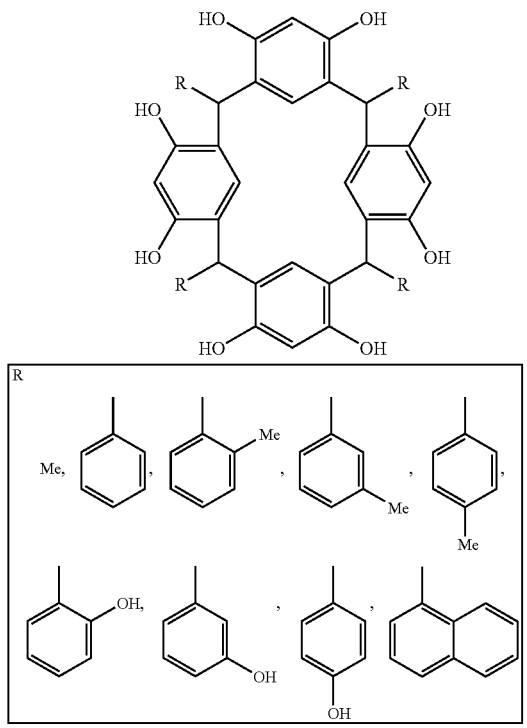

Methods for producing the compound (1) include, as being exemplified in the description of P. Timmerman et. al. in Tetrahedron, 52, (1996) p 2663-2704, a method of subjecting a resorcinol optionally substituted with methyl group (hereinafter, occasionally referred to as resorcinols) and an aldehyde to dehydration condensation in the presence of an aqueous solvent with an acid catalyst, and the like.

The resorcinols used for producing the compound (I) include, for example, resorcinol, 2-methylresorcinol, and 5-methylresorcinol. Preferably used is resorcinol due to commercial availability thereof.

The aldehydes used for producing the compound (1) include, for example, aliphatic aldehydes such as acetaldehyde, n-butylaldehyde, isobutylaldehyde, n-hexylaldehyde, n-dodecylaldehyde, 3-phenylpropionealdehyde and 5-hydroxypentanal; and aromatic aldehyde such as benzaldehyde, 1-naphthaldehyde, 2-methylbenzaldehyde, 3-methylbenzaldehyde, 4-methylbenzaldehyde, 2-hydroxybenzaldehyde, 3-hydroxybenzaldehyde, 4-hydroxybenzaldehyde, 4-t-butylbenzaldehyde, 4-phenylbenzaldehyde, 2-methoxybenzaldehyde, 3-methoxybenzaldehyde, 4-methoxybenzaldehyde, 2-chlorobenzaldehyde, 3-chlorobenzaldehyde, 4-chlorobenzaldehyde, 2-bromobenzaldehyde, 3-bromobenzaldehyde, 4-bromobenzaldehyde, 2-fluorobenzaldehyde, 3-fluorobenzaldehyde, 4-fluorobenzaldehyde, 2-methylthiobenzaldehyde, 3-methylthiobenzaldehyde, 4-methylthiobenzaldehyde, 2-carboxybenzaldehyde, 3-carboxybenzaldehyde, 4-carboxybenzaldehyde, 3-nitrobenzaldehyde, 4-aminobenzaldehyde, 4-acetylaminobenzaldehyde and 4-cyanobenzaldehyde.

The use amount of aldehyde is usually about 1 to 3 moles, preferably about 1.2 to 2.5 moles, per mole of resorcinols.

The acid catalyst used for producing the compound (1) includes, for example, hydrochloric acid, sulfuric acid, phosphoric acid, nitric acid and acetic acid. Among of them, hydrochloric acid and sulfuric acid are preferably used. The use amount of acid catalyst is usually about 0.001 to 3 moles per mole of resorcinols.

The aqueous solvent used for producing the compound (I) is a mixture of water and an organic solvent mixable with water in optional ratios. The organic solvent includes, for example, alcohols such as methanol, ethanol and i-propylalcohol; and ethers such as tetrahydrofuran. When these solvents are used, they may be used alone or a mixture of two or more kinds thereof.

As the aqueous solvent, preferably used are alcohols having 3 or less carbon atoms or a mixture of water and alcohols having 3 or less carbon atoms, and preferably alcoholic solvents having 3 or less carbon atoms.

The ratio of use amount of resorcinols to aqueous solvent is usually 0.5 to 5 parts by weight, preferably 1 to 2 parts by weight, per 1 part by weight of the aqueous solvent.

Methods for producing the compound (1) include, for example, a method of mixing together resorcinols, an aldehyde, an acid catalyst, and an aqueous solvent, followed by stirring usually at 0 to 100° C., and preferably 30 to 90° C. to precipitate a compound (1) and then to collect the precipitated by filtration; a method of mixing an aldehyde with a mixture of resorcinols, an acid catalyst, and an aqueous solvent usually at 0 to 100° C., and preferably 30 to 90° C. to precipitate a compound (1) and then to collect the precipitated by filtration; a method of mixing resorcinols with a mixture of an aldehyde, an acid catalyst, and an aqueous solvent usually at 0 to 100° C., and preferably 30 to 90° C. to precipitate a compound (1) and then to collect the precipitated by filtration; and a method of mixing an acid catalyst with a mixture of resorcinols, an aldehyde, and an aqueous solvent usually at 0 to 100° C., and preferably 30 to 90° C. to precipitate a compound (1) and then to collect the precipitated by filtration.

In these methods, a poor solvent such as water may be added before collecting the precipitated compound (1) by filtration.

The compound (1) collected is dried usually at a room temperature to about 100° C. by ventilation, under reduced pressure, or the like. As alternative, drying may be conducted after the collected compound (1) is washed with a hydrophilic organic solvent to replace the aqueous solvent contained therein. The hydrophilic organic solvent includes, for example, alcohols such as methyl alcohol, ethyl alcohol, n-propyl alcohol and t-butyl alcohol; aliphatic nitriles such as acetonitrile; aliphatic ketones such as acetone; aliphatic sulfoxides such as dimethylsulfoxide; and aliphatic carboxylic acids such as acetic acid.

The activated carbon used in the present invention can be obtained by carbonizing, or carbonizing and activating a dried compound (1).

The specific methods for producing the activated carbon used in the present invention include, for example, (I) a method of calcining (carbonizing) the compound (1) under an atmosphere of an inactive gas to carbon such as nitrogen, argon, helium, and hydrogen at a temperature usually in the range of 200 to 1500° C., preferably 600 to 1100° C. for usually about 1 minute to 24 hours, followed by calcining (activating) the obtained one under an oxidative gas such as $H_2O$, $CO_2$, and $O_2$ at a temperature usually in the range of 200 to 1500° C., preferably 600 to 1100° C. for usually about 1 minute to 10 hours; (II) a method of calcining (carbonizing and activating) under an oxidative gas at a temperature usually in the range of 200 to 1500° C., preferably 600 to 1100° C. for usually about 1 minute to 24 hours; (III) a method of calcining (carbonizing) the compound (1) under an oxidative gas such as air usually at a temperature of 400° C. or less, preferably 200 to 300° C. for usually about 1 minute to 24 hours, calcining (carbonizing) under an atmosphere of gas inactive to carbon at a temperature usually in the range of 200 to 1500° C., and preferably 600 to 1100° C. for usually about 1 minute to 24 hours, followed by further calcining (activating) under an oxidative gas at a temperature usually in the range of 200 to 1500° C., preferably 600 to 1100° C. for usually about 1 minute to 10 hours; (IV) a method of calcining (carbonizing) the compound (1) under an oxidative gas such as air at usually 400° C. or less, preferably 200 to 300° C. for usually about 1 minute to 24 hours, followed by calcining (activating) in the presence of $H_2O$ or $CO_2$ at a temperature usually in the range of 200 to 1500° C., preferably 600 to 1100° C. for usually about 1 minute to 10 hours; and (V) a method of calcining (carbonizing) the compound (1) under vacuum at usually 200 to 1500° C., and preferably 600 to 1100° C. for usually about 1 minute to 24 hours, followed by calcining (activating) at a temperature usually in the range of 200 to 1500° C., preferably 600 to 1100° C. for usually about 1 minute to 10 hours, and the like.

These methods (I) to (V) are preferable because of not being contaminated with metals. The preferably used oxidative gases are $H_2O$ or $CO_2$.

It is preferable that, when calcining at a temperature of 200° C. or more, the pore volume is enhanced, and, when calcining at 1500° C. or less, the activated carbon yields are enhanced. It is also preferable that, when calcining for 1 minute or more, the pore volume is enhanced, and, when calcining for 24 hours or less, the activated carbon yields are enhanced.

The activated carbon thus obtained has a total pore volume of usually less than 0.95 ml/g, and preferably 0.5 ml/g or more and 0.93 ml/g or less. It is preferable that, when having the total pore volume of less than 0.95 ml/g, electrostatic capacity per unit volume is enhanced.

To provide the total pore volume in such ranges, it may appropriately adjust the times and temperatures for calcining.

The total pore volume is calculated from an amount of nitrogen absorbed at around 0.95 relative pressure in an absorption isotherm determined at a temperature of liquid nitrogen by AUTOSORB (manufactured by Yuasa Ionics Inc.).

When applying thus obtained activated carbon to an electrode, the activated carbon is crushed into particles having an average particle diameter of usually 50 μm or less, preferably 30 μm or less, more preferably 10 μm or less. By crushing the activated carbon in fine particles, bulk density of an electrode can be enhanced and internal resistance thereof can be reduced.

Here, the average particle diameter means volume average particle diameter of the activated carbon dispersed with a solution containing a neutral detergent measured by Laser Diffraction Type Particle Size Distribution Analyzer model SALD-2000J (Trade name, manufactured by Shimadzu Co.).

Crushing is preferably carried out by using a crusher for fine grinding such as impact-friction crushers, centrifugal crushers, ball mills (tube mills, compound mills, conical ball mills, rod mills), vibrating mills, colloid mills, friction disk mills, and jet mills.

If a ball mill, which is general for crushing, is employed, the ball and crushing vessel thereof is preferably made of non-metal materials such as alumina, zirconia and agate to avoid contamination of metal powder.

Thus obtained activated carbon having a total pore volume of less than 0.95 ml/g and a content of alkali metal component and alkaline earth metal component of 100 ppm or less can be preferably used for electrodes due to no polarization to be caused by metals and providing abundant electric double layer.

The electrode of the present invention is characterized by including the above mentioned activated carbon therein, and usually further includes a binder, conducting agent and the like therein to improve moldability thereof.

The electrode is generally produced by methods for molding a mixture of an activated carbon, a binder, a conducting agent and the like on a current collector. These methods include, for example, a method of coating a slurry mixture of an binder, a conducting agent, a solvent and the like on a current collector by doctor blade method or dipping the collector in the slurry mixture, followed by drying; a method of preparing a sheet by mixing, molding and then drying a mixture of an activated carbon, a binder, a conducting agent, a solvent and the like, disposing the sheet on a current collector with interposing a conductive adhesive and then subjecting to pressing and heating treatments and drying; and a method of molding a mixture of an activated carbon, a binder, a conducting agent, a liquid lubricant and the like on a current collector, removing the liquid lubricant to obtain a sheet and then stretching the sheet in mono- or multi-axial directions.

When the electrode is formed in a sheet shape, the thickness thereof is usually about 50 to about 1000 μm.

Ingredient materials for the current collector include, for example, metals such as nickel, aluminium, titanium, copper, gold, silver, platinum, aluminium alloy and stainless steel; carbon material or activated carbon fibers coated by plasma or ark spraying with nickel, aluminium, zinc, copper, tin or lead or an alloy thereof; and conductive films composed of resins containing a conducting agent dispersed therein such as rubbers and styrene-ethylene-butylene-styrene copolymer (SEBS). Aluminium is particularly preferable due to its lightness, excellent in conductivity and electrochemical stability.

Configurations of the current collector include, for example, foil, plate, mesh, net, lath, punching and emboss and a combination thereof (for example, meshed plate).

Corrugated surface may be formed on a surface of the current collector by etching.

The conducting agent includes, for example, electro-conductive carbons such as graphite, carbon black, acetylene black, Ketjenblack and activated carbons other than that of the invention; graphitic conductants such as natural graphites, thermally expandable graphites, flake graphites and expandable graphites; carbon fibers such as vapor-grown carbon fibers; fine powders or fibers of metals such as aluminium, nickel, copper, silver, gold and platinum; electro-conductive metal oxides such as ruthenium oxide or titanium oxide; and electro-conductive polymers such as polyaniline, polypyrrole, polythiophene, polyacetylene and polyacene.

Particularly preferable are carbon black, acetylene black and Ketjenblack due to their ability to effectively enhance conductivity with small quantity thereof.

Content of the conducting agent blended in the electrode is usually about 5 to about 50 parts by weight, preferably about 10 to about 30 parts by weight, based on 100 parts by weight of the activated carbon of the present invention.

The binder includes, for example, polymers of fluorine compounds; the fluorine compounds include, for example, fluorinated alkyl(1 to 18 carbon atoms)(meth)acrylate, perfluoroalkyl(meth)acrylates [such as perfluorododecyl(meth)

acrylate, perfluoro-n-octyl(meth)acrylate and perfluoro-n-butyl(meth)acrylate], perfluoroalkyl-substituted alkyl(meth)acrylates [such as perfluorohexylethyl(meth)acrylate and perfluorooctylethyl(meth)acrylate], perfluorooxyalkyl (meth)acrylates [such as perfluorododecyloxyethyl(meth)acrylate and perfluorodecyloxyethyl(meth)acrylate], fluorinated alkyl(1 to 18 carbon atoms)crotonate, fluorinated alkyl(1 to 18 carbon atoms)malate and fumarate, fluorinated alkyl(1 to 18 carbon atoms)itaconate and fluorinated alkyl-substituted olefines (having 2 to 10 carbon atoms and 1 to 17 fluorine atoms) such as perfluorohexylethylene, fluorinated olefine having 2 to 10 carbon atoms and 1 to 20 fluorine atoms whose a fluorine atom binds to the double-bonded carbon atom, tetrafluoroethylene, trifluoroethylene, vinylidene fluoride and hexafluoropropylene.

The binder further includes, for example, polymers produced by addition polymerization of monomers having ethylenic double bond but not having fluorine atom; such monomers include, for example, (cyclo)alkyl(1 to 22 carbon atoms) (meth)acrylates [such as methyl(meth)acrylate, ethyl(meth)acrylate, n-butyl(meth)acrylate, iso-butyl(meth)acrylate, cyclohexyl(meth)acrylate, 2-ethylhexyl(meth)acrylate, iso-decyl(meth)acrylate, lauryl(meth)acrylate, octadecyl(meth)acrylate]; aromatic ring containing (meth)acrylates [such as benzyl(meth)acrylate and phenylethyl(meth)acrylate]; mono (meth)acrylates of alkyleneglycol or dialkyleneglycol (having 2 to 4 carbon atoms in its alkylene group) [such as 2-hydroxyethyl(meth)acrylate 2-hydroxypropyl(meth)acrylate, diethyleneglycolmono(meth)acrylate]; and (poly)glycerin(1 to 4 of polymerization degree)mono(meth)acrylate; (meth) acrylates [such as polyfunctional(meth)acrylates [such as (poly)ethyleneglycol (1 to 100 of polymerization degree)di(meth)acrylate, (poly)propyleneglycol (1 to 100 of polymerization degree)di(meth)acrylate], 2,2-bis(4-hydroxyethylphenyl)propanedi(meth)acrylate and, trimethylolpropanetri(meth)acrylate]; (metha)acrylamide-based monomers including (metha)acrylamide and (metha) acrylamidic derivatives [such as N-methylol(metha)acrylamide and diacetone acrylamide]; monomers containing cyano group such as (metha)acrylonitrile, 2-cyanoethyl (meth)acrylate and 2-cyanoethylacrylamide; styrene-based monomers such as styrene and styrene derivatives having 7 to 18 carbon atoms [such as a-methylstyrene, vinyltouene, p-hydroxystyrene and divinylbenzene]; diene-based monomers such as alkadiene having 4 to 12 carbon atoms [such as butadiene, isoprene and chloroprene]; alkenylester-based monomers which include vinyl carboxylate (having 2 to 12 carbon atoms) [such as vinyl acetate, vinyl propionate, vinyl butyrate and vinyl octanoate], and (meth)allyl carboxylate (having 2 to 12 carbon atoms) [such as (meth)allyl acetate (meth)allyl propionate and (meth)allyl octanoate]; monomers containing epoxy group such as glycidyl(meth)acrylate and (metha)allylglycidyl ether; monoolefines including monoolefine having 2 to 12 [such as ethylene, propylene, 1-butene, 1-octene and 1-dodecene]; monomers containing chlorine, bromine or iodine atoms, e.g. monomers containing halogen atoms excluding fluorine atom such as vinyl chloride and vinylidene chloride; (meth)acrylic acid such as acrylic acid and methacrylic acid; and monomers having conjugated double bonds such as butadiene and isoprene.

Further, the polymers produced by addition polymerization may be copolymers composed of a plurality of monomers such as ethylene-vinyl acetate copolymer, styrene-butadiene copolymer and ethylene-propylene copolymer. Furthermore, polymers of vinyl carboxylate may be partially or completely saponificated such as polyvinyl alcohol.

The binder may be copolymers composed of fluorine compounds and monomers having ethylenic double bond but not having fluorine atom.

The binder further include, for example, polysaccharides and derivatives thereof such as starch, methylcellulose, carboxymethylcellulose, hydroxymethylcellulose, hydroxyethylcellulose, hydroxypropylcellulose, carboxymethylhydroxyethylcellulose and nitrocellulose; phenol resins; melamine resins; polyurethane resins; urea resins; polyimide resins; polyamide-imide resins; petroleum pitches and coal-tar pitches.

Among them, the binder is preferably polymers of fluorine compound, particularly preferably polytetrafluoroethylene of tetrafluoroethylene polymer.

As the binder, a plurality of binders can be used. Amount of the binder blended in the electrode is usually about 0.5 to about 30 parts by weight, preferably about 2 to about 30 parts by weight, based on 100 parts by weight of activated carbon.

A solvent used for the binder includes, for example, alcohols such as IPA (isopropyl alcohol), ethanol and methanol as well as ethers and ketones.

When the binder is highly viscous, plasticizers may be applied to allow coatability on a current collector.

The conducting adhesives are usually a mixture of above described conducting agents and binders. Among them, a mixture of carbon black and polyvinyl alcohol is preferable because of solvent free, easy preparation and enhanced preservability thereof.

The electrode of the present invention is applied for an electrode of dry batteries, redox capacitors, hybrid capacitors and electric double-layer capacitors.

The redox capacitor is a device having an electrode containing active material to store electric power by oxidation-reduction reaction as described, for example, in the third chapter (from the 141 page) of "DAI-YOURYOU DENKI NIJYUSO CAPACITOR NO SAIZENSEN (The leading edge of large capacity electric double-layer capacitors, compiled under the editorship of TAMURA HIDEO, published by NTS Inc.) This capacitor is constituted with two electrodes interposing therebetween a similar separator used in the electric double-layer capacitor mentioned below and an electrolytic solution being filled therein. In the present invention, an electrolytic solution defines a mixture of an electrolyte and a solvent.

The active material used for the redox capacitor includes oxides of transition metals such as ruthenium, transition metal hydroxides and conductive polymers.

The electrode includes the activated carbon of present the invention alone or 1 to 60% by weight of a mixture of the activated carbon of the present invention and the conducting agent exemplified above and 2 to 30% by weight of the binder exemplified above.

The electrolytic solution for the redox capacitor, when an oxide of transition metals such as ruthenium or transition metal hydroxide is used as the active material, includes aqueous sulfuric acid solution, for example, under conditions disclosed in Kokai No. 2002-359155. When using an organic acid as the electrolyte and an electrolytic solution dissolved in an organic solvent, for example, conditions disclosed in Kokai No. 2002-267860 are applied. When using a conductive polymer as the active material, an electrolyte capable of being dissolved in an organic solvent and dissociated may be applied, for example, including lithium salts such as $LiBF_4$, $LiPF_6$ and $LiClO_4$. $LiPF_6$ is particularly preferably applied due to large ionization degree and favorable solubility thereof. These electrolytes may be used alone, or a mixture of at least two kinds thereof, respectively. Concentration of the electrolyte in the electrolytic solution is preferably 0.5 to 1.5 mole/L in order to have favorable ionic conductivity. When the concentration of electrolyte is 0.5 mole/L or more, it is preferable to enhance the electrostatic capacity, and when 1.5 mole/L or less, it is preferable to enhance ionic conductivity due to reduction of viscosity of the electrolytic solution.

As the solvent contained in the electrolytic solution for the redox capacitor, an organic polar solvent exemplified for the electric double-layer capacitor mentioned hereinafter is preferably used. Among them, an aprotic organic solvent is preferably used, for example, a solvent of cyclic carbonates, chain carbonates or cyclic esters or a mixture of at least two kinds thereof are illustrated. The cyclic carbonates include, for example, ethylene carbonate, propylene carbonate and the like; the chain carbonates include, for example, dimethyl carbonate, diethyl carbonate, methylethyl carbonate and the like; and the cyclic carbonate esters include, for example, γ-butyrolactone, γ-valerolactone and the like. These may be used alone or a mixture of at least 2 kinds thereof, respectively. Required properties for the electrolytic solution are high dielectric constant to assist dissociation of electrolyte as well as low viscosity not to disturb mobility of ions and further high resistance against electrochemical oxidation and reduction. Therefore, the carbonates are particularly preferable for the solvent, for example, it is preferable to use a mixture of ethylene carbonate as a solvent having high dielectric constant and diethyl carbonate as a solvent having low viscosity.

The hybrid capacitor is a device in which, during charging, lithium ions are induced into layers of carbon such as graphite at the negative pole and anions of electrolyte are drawn on the electrode surface at the positive pole, resulting of formation of electric double layer to store electric power. This capacitor is constituted by using a similar electrode at the negative pole as applied for a negative pole of lithium-ion secondary battery, using the above mentioned electrode of the present invention at the positive pole, interposing a similar separator as used in the electric double-layer capacitor mentioned below between the positive and negative electrodes and filling an electrolytic solution therein. Specifically, as the electrode of negative pole, those described in the third section of the first chapter (from the 25 page) of "JISEDAI-KATA LITHIUM NIJI-DENTI (Lithium secondary batteries in the next generation, compiled under the editorship of TAMURA HIDEO, published by NTS Inc.) can be used.

The electrolyte for hybrid capacitor usually employs combinations of inorganic anions and lithium cation, and preferably a combination of lithium cation and at least one inorganic anion selected from the group consisting of $BF_4^-$, $PF_6^-$ and $ClO_4^-$.

The organic polar solvent contained in the electrolytic solution for the hybrid capacitor usually employs a solvent mainly composed of at least one kind of the group consisting of carbonates and lactones. The solvent includes, for example, cyclic carbonates such as propylene carbonate, ethylene carbonate and butylene carbonate, chain carbonates such as dimethyl carbonate, ethylmethyl carbonate and diethyl carbonate, and γ-butyrolactone; and preferably a mixture of ethylene carbonate and at least one kind of chain carbonates, γ-butyrolactone alone or a mixture of γ-butyrolactone and at least one kind of chain carbonates.

Additives such as those exemplified in the section about electric double-layer capacitor can be used.

The electrode of the present invention is preferably used for an electrode of the electric double-layer capacitor because of the enhanced electrostatic capacity thereof. The electric double-layer capacitor is explained in more detail below.

The electric double-layer capacitor of the present invention is a capacitor characterized by including the electrode above mentioned; specifically, being a capacitor constituted by disposing independently a separator between the two electrodes as positive and negative electrodes mentioned above and filling an electrolytic solution between the separator and the electrodes, or being a capacitor constituted by filling a solid electrolyte (a gel electrolyte) between the two electrodes as positive and negative electrodes mentioned above.

According to charging, the positive electrode is positively charged resulting formation of an electric double layer at the boundary of the positive electrode by negative electrolyte as well as the negative electrode is negatively charged resulting formation of an electric double layer at the boundary of the negative electrode by positive electrolyte, consequently electric energy is stored. The electric double layers are maintained after stopping charging, but dissipate along with releasing electric energy by discharging.

The electric double-layer capacitor may be constituted with a single cell including positive and negative poles, or a combination of plurality cells.

The solid electrolyte is a resin dispersed with an electrolyte mentioned hereinafter, and may be further dispersed with an organic polar solvent also mentioned hereinafter; specifically including a gel electrolyte described at the 79 page of "DAI-YOURYOU DENKI NIJYUSO CAPACITOR NO SAIZENSEN (The leading edge of large capacity electric double-layer capacitors, compiled under the editorship of TAMURA HIDEO, published by NTS Inc.) or solid electrolytes disclosed in Kokai No. 2004-172346 and cited documents thereof, Kokai No. 2004-303567 and cited documents thereof, Kokai No. 2003-68580 and cited documents thereof and Kokai No. 2003-257240.

The electric double-layer capacitor of the present invention is preferably an electric double-layer capacitor which has an independent separator between two electrodes as positive and negative electrodes mentioned above and fills an electrolytic solution between the separator and electrodes; this electric double-layer capacitor is explained in more detail hereinafter.

Configurations of the electric double-layer capacitor include coin-shaped, wound, laminated or accordion formations, and the like.

A method for producing a coin-shaped capacitor includes, as shown in FIG. 1, layering (or laminating) a current collector (12), an electrode (13), a separator (14), an electrode (13) and a current collector (12) in this order within a metallic case (11) made of stainless steel and the like, filling the case with an electrolytic solution and then sealing with a metallic lid (15) and gasket (16).

Figure 2:
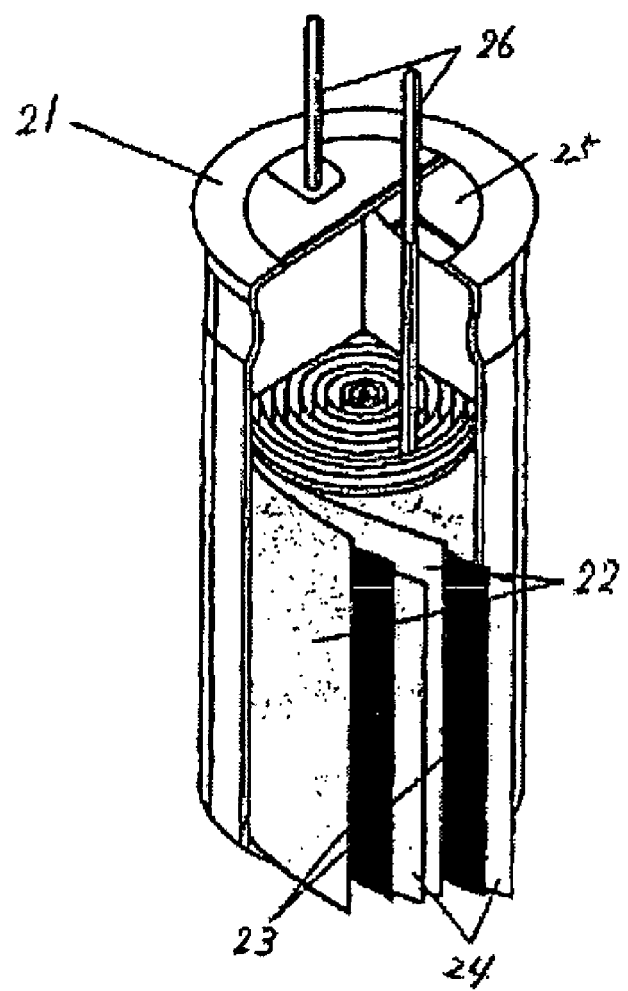
FIG. 2 is a schematic diagram of one embodiment of a wound electric double-layer capacitor.

A method for producing a wound capacitor includes, as shown in FIG. 2, coating on a current collector (22) a slurry mixture containing the above mentioned activated carbon and then drying to prepare a laminated sheet composed of the current collector (22) and an electrode (23), winding two of the sheets with interposing a separator (24) therebetween and then housing this wound sheets in a metallic case (21) made of aluminium, stainless steel and the like together with an electrode sealing pad (25).

In this method, since the current collector is previously equipped with a lead, electric energy is charged or discharged through a lead (26) provided to one layered sheet as a positive pole and another lead (26) provided to another layered sheet as a negative pole.

Figure 3:
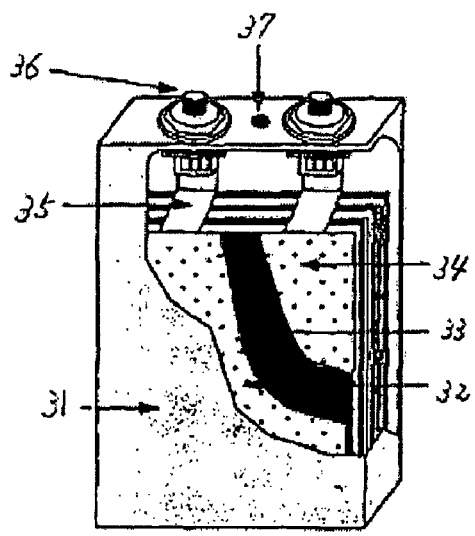
FIG. 3 is a schematic diagram of one embodiment of a laminated electric double-layer capacitor.

A method for producing a layered capacitor includes, as shown in FIG. 3, alternately laminating (or piling) a layered sheet composed of a current collector (32) and an electrode (33) on a separator (34), housing this layers in a metallic case

Figure 4:
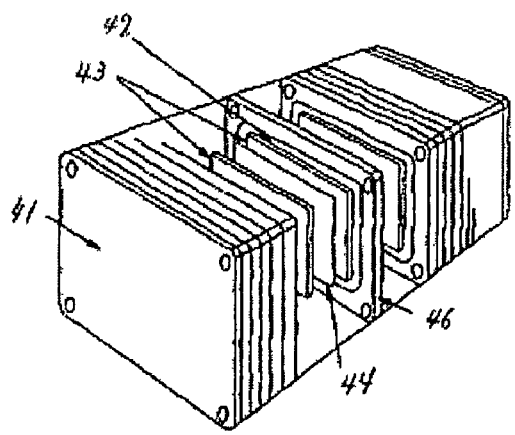
FIG. 4 is a schematic diagram of another embodiment of a laminated electric double-layer capacitor different from the capacitor drawn in FIG. 3.

(31) made of aluminium, stainless steel and the like, filling the case with an electrolytic solution, alternately connecting the current collectors to a lead (35) and then sealing; or a method, as shown in FIG. 4, alternately connecting with pressure a layer sheet composed of a current collector (42) and an electrode (43) on a separator (44), sealing the outermost layer with rubber and the like, filling an electrolytic solution and then sealing. In this method, a bipolar structure appropriately including a gasket (46) is possible to optionally adjust an application voltage.

Figure 5:
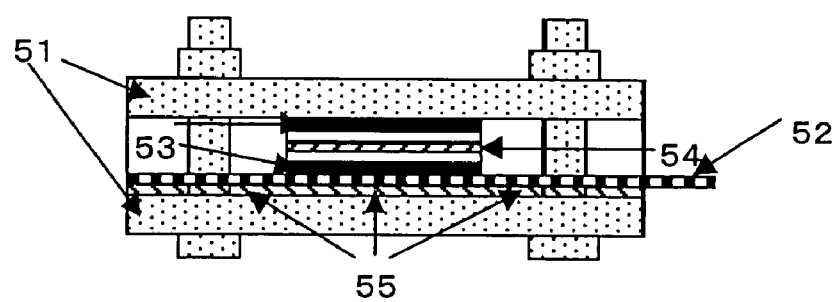
FIG. 5 is a schematic diagram of one embodiment of the laminated electric double-layer capacitor used in Examples and Comparative Examples of the invention.

Examples of the present invention are carried out with an electric double-layer capacitor which is constituted, as shown in FIG. 5, by layering a sheet-shaped electrode (53), a separator (54), an electrode (53), an current collector (52) and insulating material (55) in this order between pressure plates (51), filling an electrolytic solution between the separator (54) and the electrode (53), sealing the outermost layer with fluorine resin and then fastening by bolts. The bolts are insulated from the current collector (52).

A method for producing an accordion capacitor includes layering in accordion-folding manner an electrode and two current collector sheets with interposing a separator therebetween, and then preparing by the same way as applied to the layered capacitor.

The separator used for the electric double-layer capacitor functions to separate positive and negative electrodes and to retain an electrolytic solution; for this reason, it applies a membrane having large ionic permeability, predetermined mechanical strength and electric insulating ability.

The separator includes, for example, papers made of a viscose rayon, natural cellulose and the like, electrolytic papers, kraft papers, manila papers, mixed papers made of fibers such as cellulose and polyester, polyethylene non-woven fabrics, polypropylene non-woven fabrics, polyester non-woven fabrics, glass fibers, porous polyethylenes, porous polypropylenes, porous polyesters, aramid fibers, polybutyleneterephthalate non-woven fabrics, wholly aromatic p-polyamides, vinylidene fluoride, tetrafluoroethylene, copolymers of vinylidene fluoride and hexafluoro propylene, and fabrics and porous membranes of resins containing fluorine atom such as fluororubber.

The separator may be a molded article composed of particles of ceramics such as silica and binders mentioned above. The molded article is usually integrally molded with both of positive and negative electrodes. A separator employing polyethylene or polypropylene may contain surfactants or silica particles to enhance hydrophilicity thereof. The separator may further contain organic solvents such as acetone, plasticizer such as dibutylphthalate (DBP), and others.

As the separator, a proton conductive polymer can be used.

Among them, preferable separators include electrolytic papers, papers made of a viscose rayon or natural cellulose, kraft papers, manila papers, mixed papers made of cellulose or polyester fibers, polyethylene non-woven fabrics, polypropylene non-woven fabrics, polyester non-woven fabrics, sheets of Manila hemp and sheets of glass fibers.

The separator usually has pores of about 0.01 to about 10 μm. The separator usually has thickness of about 1 to about 300 μm, preferably about 5 to about 30 μm.

The separator may be a layered separator laminating separators having different pore ratios.

Electrolytes used for the electric double-layer capacitor include inorganic electrolytes and organic electrolytes. The inorganic electrolytes include, for example, acids such as sulfuric acid, hydrochloric acid, and perchloric acid; bases such as sodium hydroxide, potassium hydroxide, lithium hydroxide, and tetraalkylammonium hydroxide; and salts such as sodium chloride and sodium sulfate. As inorganic electrolytes, aqueous sulfuric acid is suitable due to its excellent stability and low ability corroding materials composing the electric double-layer capacitor.

Concentration of the inorganic electrolytes is usually about 0.2 to 5 moles (electrolyte)/L (electrolytic solution), preferably about 1 to 2 moles (electrolyte)/L (electrolytic solution). When the concentration is 0.2 to 5 moles/L, favorable ionic conductivity can be obtained in an electrolytic solution.

The inorganic electrolytes are usually mixed with water to be used as an electrolytic solution.

The organic electrolyte includes, for example, a combination of the following inorganic anions and organic cations described below. The anions include $BO_3^{3-}$, $F^-$, $PF_6^-$, $BF_4^-$, $AsF_6^-$, $SbF_6^-$, $ClO_4^-$, $AlF_4^-$, $AlCl_4^-$, $TaF_6^-$, $NbF_6^-$, $SiF_6^{2-}$, $CN^-$ and $F(HF)_n^-$ (wherein n represents an integer of 1 or more and 4 or less); a combination of organic anions described below and the organic cations, and a combination of the organic anions and inorganic cations such as lithium ion, sodium ion, potassium ion, hydrogen ion, and the like.

The organic cation is a cationic organic compound such as organic quaternary ammonium cation and organic quaternary phosphonium cation.

The organic quaternary ammonium cation is meant by a quaternary ammonium cation of which a hydrocarbon group selected from the group consisting of alkyl group (having 1 to 20 carbon atoms), cycloalkyl group (having 6 to 20 carbon atoms), aryl group (having 6 to 20 carbon atoms) and aralkyl group (having 7 to 20 carbon atoms) is substituted with nitrogen atom, and the organic quaternary phosphonium cation is meant by a quaternary phosphonium cation of which the same hydrocarbon groups described above is substituted with phosphorus atom.

The substituted hydrocarbon group may be further coupled with hydroxyl group, amino group, nitro group, cyano group, carboxyl group, ether group, aldehyde group and the like.

The typical organic quaternary ammonium cations and organic quaternary phosphonium cations are exemplified as follows:

(Tetraalkylammonium Cations)
tetramethylammonium, ethyltrimethylammonium, triethylmethylammonium, tetraethylammonium, tetra-n-propylammonium, tetra-n-butylammonium, diethyldimethylammonium, methyltri-n-propylammonium, tri-n-butylmethylammonium, ethyltri-n-butylammonium, tri-n-octylmethylammonium, ethyltri-n-octylammonium, diethylmethyl-i-propylammonium, diethylmethyl-n-propylammonium, ethyldimethyl-i-propylammonium, ethyldimethyl-n-propylammonium, diethylmethylmethoxyethylammonium, dimethylethylmethoxyethylammonium, benzyltrimethylammonium, $(CF_3CH_2)(CH_3)_3N+$, $(CF_3CH_2)_2(CH_3)_2N+$ and the like;

(Ethylenediammonium Cations)
N,N,N,N',N',N'-hexamethylethylenediammonium, N,N'-diethyl-N,N,N',N'-tetramethylethylenediammonium and the like;

(Bicyclic-Ammonium Cation Represented by the Following Formula)

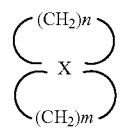

(wherein X represents nitrogen or phosphorus atoms, n and m independently represent an integer of 4 to 6.);

(Guanidinium Cations Having Imidazolinium Skelton)
2-dimethylamino-1,3,4-trimethylimidazolinium,
2-diethylamino-1,3,4-trimethylimidazolinium,
2-diethylamino-1,3-dimethyl-4-ethylimidazolinium,
2-dimethylamino-1-methyl-3,4-diethylimidazolinium,
2-diethylamino-1-methyl-3,4-diethylimidazolinium,
2-diethylamino-1,3,4-triethylimidazolinium,
2-dimethylamino-1,3-dimethylimidazolinium,
2-diethylamino-1,3-dimethylimidazolinium,
2-dimethylamino-1-ethyl-3-methylimidazolinium,
2-diethylamino-1,3-diethylimidazolinium,
1,5,6,7-tetrahydro-1,2-dimethyl-2H-0imide[1,2a]imidazolinium,
1,5-dihydro-1,2-dimethyl-2H-imide[1,2a]imidazolinium,
1,5,6,7-tetrahydro-1,2-dimethyl-2H-pyrimido[1,2a]imidazolinium,
1,5-dihydro-1,2-dimethyl-2H-pyrimido[1,2a]imidazolinium,
2-dimethylamino-4-cyano-1,3-dimethylimidazolinium,
2-dimethylamino-3-cyanomethyl-1-methylimidazolinium,
2-dimethylamino-4-acetyl-1,3-dimethylimidazolinium,
2-dimethylamino-3-acetylmethyl-1-methylimidazolinium,
2-dimethylamino-4-methylcarbo-oxymethyl-1,3-dimethylimidazolinium,
2-dimethylamino-3-methylcarbo-oxymethyl-1-methylimidazolinium,
2-dimethylamino-4-methoxy-1,3-dimethylimidazolinium,
2-dimethylamino-3-methoxymethyl-1-methylimidazolinium,
2-dimethylamino-4-formyl-1,3-dimethylimidazolinium,
2-dimethylamino-3-formylmethyl-1-methylimidazolinium,
2-dimethylamino-3-hydroxyethyl-1-methylimidazolinium,
2-dimethylamino-4-hydroxymethyl-1,3-dimethylimidazolinium and the like;

(Guanidinium Cations Having Imidazolium Skelton)
2-dimethylamino-1,3,4-trimethylimidazolium,
2-diethylamino-1,3,4-trimethylimidazolium,
2-diethylamino-1,3-dimethyl-4-ethylimidazolium,
2-dimethylamino-1-methyl-3,4-diethylimidazolium,
2-diethylamino-1-methyl-3,4-diethylimidazolium,
2-diethylamino-1,3,4-triethylimidazolium,
2-dimethylamino-1,3-dimethylimidazolium,
2-diethylamino-1,3-dimethylimidazolium,
2-dimethylamino-1-ethyl-3-methylimidazolium,
2-diethylamino-1,3-diethylimidazolium,
1,5,6,7-tetrahydro-1,2-dimethyl-2H-imide[1,2a]imidazolium,
1,5-dihydro-1,2-dimethyl-2H-imide[1,2a]imidazolium,
1,5,6,7-tetrahydro-1,2-dimethyl-2H-pyrimido[1,2a]imidazolium, imidazolium,
2-dimethylamino-4-cyano-1,3-dimethylimidazolium,
2-dimethylamino-3-cyanomethyl-1-methylimidazolium,
2-dimethylamino-4-acetyl-1,3-dimethylimidazolium,
2-dimethylamino-3-acetylmethyl-1-methylimidazolium,
2-dimethylamino-4-methylcarbo-oxymethyl-1,3-dimethylimidazolium,
2-dimethylamino-3-methylcarbo-oxymethyl-1-methylimidazolium,
2-dimethylamino-4-methoxy-1,3-dimethylimidazolium,
2-dimethylamino-3-methoxymethyl-1-methylimidazolium,
2-dimethylamino-4-formyl-1,3-dimethylimidazolium,
2-dimethylamino-3-formylmethyl-1-methylimidazolium,
2-dimethylamino-3-hydroxyethyl-1-methylimidazolium,
2-dimethylamino-4-hydroxymethyl-1,3-dimethylimidazolium and the like;

(Guanidinium Cations Having Tetrahydropyrimidinium Skelton)
2-dimethylamino-1,3,4-trimethyl-1,4,5,6-tetrahydropyrimidinium,
2-diethylamino-1,3,4-trimethyl-1,4,5,6-tetrahydropyrimidinium,
2-diethylamino-1,3-dimethyl-4-ethyl-1,4,5,6-tetrahydropyrimidinium,
2-dimethylamino-1-methyl-3,4-diethyl-1,4,5,6-tetrahydropyrimidinium,
2-diethylamino-1-methyl-3,4-diethyl-1,4,5,6-tetrahydropyrimidinium,
2-diethylamino-1,3,4-tetraethyl-1,4,5,6-tetrahydropyrimidinium,
2-dimethylamino-1,3-dimethyl-1,4,5,6-tetrahydropyrimidinium,
2-diethylamino-1,3-dimethyl-1,4,5,6-tetrahydropyrimidinium,
2-dimethylamino-1-ethyl-3-methyl-1,4,5,6-tetrahydropyrimidinium,
2-diethylamino-1,3-diethyl-1,4,5,6-tetrahydropyrimidinium,
1,3,4,6,7,8-hexahydro-1,2-dimethyl-2H-imide[1,2a]pyrimidinium,
1,3,4,6,7,8-hexahydro-1,2-dimethyl-2H-imide[1,2a]pyrimidinium,
1,3,4,6-tetrahydro-1,2-dimethyl-2H-pyrimido[1,2a]pyrimidinium,
2-dimethylamino-4-cyano-1,3-dimethyl-1,4,5,6-tetrahydropyrimidinium,
2-dimethylamino-3-cyanomethyl-1-methyl-1,4,5,6-tetrahydropyrimidinium,
2-dimethylamino-4-acetyl-1,3-dimethyl-1,4,5,6-tetrahydropyrimidinium,
2-dimethylamino-3-acetylmethyl-1-methyl-1,4,5,6-tetrahydropyrimidinium,
2-dimethylamino-4-methylcarbo-oxymethyl-1,3-dimethyl-1,4,5,6-tetrahydropyrimidinium,
2-dimethylamino-3-methylcarbo-oxymethyl-1-methyl-1,4,5,6-tetrahydropyrimidinium,
2-dimethylamino-4-methoxy-1,3-dimethyl-1,4,5,6-tetrahydropyrimidinium,
2-dimethylamino-3-methoxymethyl-1-methyl-1,4,5,6-tetrahydropyrimidinium,
2-dimethylamino-4-formyl-1,3-dimethyl-1,4,5,6-tetrahydropyrimidinium,
2-dimethylamino-3-formylmethyl-1-methyl-1,4,5,6-tetrahydropyrimidinium,
2-dimethylamino-3-hydroxyethyl-1-methyl-1,4,5,6-tetrahydropyrimidinium,
2-dimethylamino-4-hydroxymethyl-1,3-dimethyl-1,4,5,6-tetrahydro pyrimidinium and the like;

(Guanidinium Cations Having Dihydropyrimidinium Skelton)
2-dimethylamino-1,3,4-trimethyl-1,4(6)-dihydropyrimidinium,
2-diethylamino-1,3,4-trimethyl-1,4(6)-dihydropyrimidinium,
2-diethylamino-1,3-dimethyl-4-ethyl-1,4(6)-dihydropyrimidinium,
2-dimethylamino-1-methyl-3,4-diethyl-1,4(6)-dihydropyrimidinium,
2-diethylamino-1-methyl-3,4-diethyl-1,4(6)-dihydropyrimidinium,
2-diethylamino-1,3,4-tetraethyl-1,4(6)-dihydropyrimidinium, 2-dimethylamino-1,3-dimethyl-1,4(6)-dihydropyrimidinium,
2-diethylamino-1,3-dimethyl-1,4(6)-dihydropyrimidinium,
2-dimethylamino-1-ethyl-3-methyl-1,4(6)-dihydropyrimidinium,
2-diethylamino-1,3-diethyl-1,4(6)-dihydropyrimidinium,
1,6,7,8-tetrahydro-1,2-dimethyl-2H-imide[1,2a]pyrimidinium,
1,6-dihydro-1,2-dimethyl-2H-imide[1,2a]pyrimidinium,
1,6,7,8-tetrahydro-1,2-dimethyl-2H-imide[1,2a]pyrimidinium,
1,6-dihydro-1,2-dimethyl-2H-imide[1,2a]pyrimidinium,
2-dimethylamino-4-cyano-1,3-dimethyl-1,4(6)-dihydropyrimidinium,
2-dimethylamino-3-cyanomethyl-1-methyl-1,4(6)-dihydropyrimidinium,
2-dimethylamino-4-acetyl-1,3-dimethyl-1,4(6)-dihydropyrimidinium,
2-dimethylamino-3-acetylmethyl-1-methyl-1,4(6)-dihydropyrimidinium,
2-dimethylamino-4-methylcarbo-oxymethyl-1,3-dimethyl-1,4(6)-dihydropyrimidinium,
2-dimethylamino-3-methylcarbo-oxymethyl-1-methyl-1,4(6)-dihydropyrimidinium,
2-dimethylamino-4-methoxy-1,3-dimethyl-1,4(6)-dihydropyrimidinium,
2-dimethylamino-3-methoxymethyl-1-methyl-1,4(6)-dihydropyrimidinium,
2-dimethylamino-4-formyl-1,3-dimethyl-1,4,5,6-tetrahydropyrimidinium,
2-dimethylamino-3-formylmethyl-1-methyl-1,4,5,6-tetrahydropyrimidinium,
2-dimethylamino-3-hydroxyethyl-1-methyl-1,4,5,6-tetrahydropyrimidinium,
2-dimethylamino-4-hydroxymethyl-1,3-dimethyl-1,4(6)-dihydropyrimidinium and the like;
  (Pyrrolidinium Cations)
N,N-dimethylpyrrolidinium,
N-ethyl-N-methylpyrrolidinium,
N-n-propyl-N-methylpyrrolidinium,
N-n-butyl-N-methylpyrrolidinium,
N,N-diethylpyrrolidinium,
spiro-(1,1')-bipyrrolidinium and the like;
  (Piperidinium Cations)
N,N-dimethylpiperidinium,
N-ethyl-N-methylpiperidinium,
N,N-diethylpiperidinium,
N-n-propyl-N-methylpiperidinium,
N-n-butyl-N-methylpiperidinium,
N-ethyl-N-n-butylpiperidinium and the like;
  (Hexamethyleneiminium Cations)
N,N-dimethylhexamethyleneiminium,
N-ethyl-N-methylhexamethyleneiminium,
N,N-diethylhexamethyleneiminium and the like;
  (Morpholinium Cations)
N,N-dimethylmorpholinium,
N-ethyl-N-methylmorpholinium,
N-butyl-N-methylmorpholinium,
N-ethyl-N-butylmorpholinium and the like;
  (Piperazinium Cations)
N,N,N',N'-tetramethyl piperazinium,
N-ethyl-N,N',N'-trimethyl piperazinium,
N,N'-diethyl-N,N'-dimethylpiperazinium,
N,N'-triethyl-N'-methyl piperazinium,
N,N,N',N'-tetraethylpiperazinium and the like;
  (Tetrahydropyrimidinium Cations)
1,3-dimethyl-1,4,5,6-tetrahydropyrimidinium,
1,2,3-trimethyl-1,4,5,6-tetrahydropyrimidinium,
1,3,4-trimethyl-1,4,5,6-tetrahydropyrimidinium,
1,3,5-trimethyl-1,4,5,6-tetrahydropyrimidinium,
1-ethyl-2,3-dimethyl-1,4,5,6-tetrahydropyrimidinium,
1-ethyl-3,4-dimethyl-1,4,5,6-tetrahydropyrimidinium,
1-ethyl-3,5-dimethyl-1,4,5,6-tetrahydropyrimidinium,
1-ethyl-3,6-dimethyl-1,4,5,6-tetrahydropyrimidinium,
2-ethyl-1,3-dimethyl-1,4,5,6-tetrahydropyrimidinium,
4-ethyl-1,3-dimethyl-1,4,5,6-tetrahydropyrimidinium,
5-ethyl-1,3-dimethyl-1,4,5,6-tetrahydropyrimidinium,
1,2,3,4-tetramethyl-1,4,5,6-tetrahydropyrimidinium,
1,2,3,5-tetramethyl-1,4,5,6-tetrahydropyrimidinium,
8-methyl-1,8-diazabicyclo[5.4.0]-7-undecenium,
5-methyl-1,5-diazabicyclo[4.3.0]-5-nonenium,
8-ethyl-1,8-diazabicyclo[5.4.0]-7-undecenium,
5-ethyl-1,5-diazabicyclo[4.3.0]-5-nonenium,
5-methyl-1,5-diazabicyclo[5.4.0]-5-undecenium,
5-ethyl-1,5-diazabicyclo[5.4.0]-5-undecenium,
1,2,3,4-tetramethyl-1,4,5,6-tetrahydropyrimidinium,
1,2,3,5-tetramethyl-1,4,5,6-tetrahydropyrimidinium,
1-ethyl-2,3,4-trimethyl-1,4,5,6-tetrahydropyrimidinium,
1-ethyl-2,3,5-trimethyl-1,4,5,6-tetrahydropyrimidinium,
1-ethyl-2,3,6-trimethyl-1,4,5,6-tetrahydropyrimidinium,
2-ethyl-1,3,4-trimethyl-1,4,5,6-tetrahydropyrimidinium,
2-ethyl-1,3,5-trimethyl-1,4,5,6-tetrahydropyrimidinium,
4-ethyl-1,2,3-trimethyl-1,4,5,6-tetrahydropyrimidinium,
4-ethyl-1,3,5-trimethyl-1,4,5,6-tetrahydropyrimidinium,
4-ethyl-1,3,6-trimethyl-1,4,5,6-tetrahydropyrimidinium,
5-ethyl-1,2,3-trimethyl-1,4,5,6-tetrahydropyrimidinium,
5-ethyl-1,3,4-trimethyl-1,4,5,6-tetrahydropyrimidinium,
1,2-diethyl-3,4-dimethyl-1,4,5,6-tetrahydropyrimidinium,
1,2-diethyl-3,5-dimethyl-1,4,5,6-tetrahydropyrimidinium,
1,2-diethyl-3,6-dimethyl-1,4,5,6-tetrahydropyrimidinium,
1,3-diethyl-2,4-dimethyl-1,4,5,6-tetrahydropyrimidinium,
1,3-diethyl-2,5-dimethyl-1,4,5,6-tetrahydropyrimidinium,
1,4-diethyl-2,3-dimethyl-1,4,5,6-tetrahydropyrimidinium,
1,4-diethyl-3,5-dimethyl-1,4,5,6-tetrahydropyrimidinium,
1,4-diethyl-3,6-dimethyl-1,4,5,6-tetrahydropyrimidinium,
1,5-diethyl-2,3-dimethyl-1,4,5,6-tetrahydropyrimidinium,
1,5-diethyl-3,4-dimethyl-1,4,5,6-tetrahydropyrimidinium,
1,5-diethyl-3,6-dimethyl-1,4,5,6-tetrahydropyrimidinium,
2,4-diethyl-1,3-dimethyl-1,4,5,6-tetrahydropyrimidinium,
2,5-diethyl-1,3-dimethyl-1,4,5,6-tetrahydropyrimidinium,
4,5-diethyl-1,3-dimethyl-1,4,5,6-tetrahydropyrimidinium,
4,6-diethyl-1,3-dimethyl-1,4,5,6-tetrahydropyrimidinium,
1,2,3,4,5-pentamethyl-1,4,5,6-tetrahydropyrimidinium,
1,2,3,4,6-pentamethyl-1,4,5,6-tetrahydropyrimidinium,
1,2,3,4,5,6-hexamethyl-1,4,5,6-tetrahydropyrimidinium,
4-cyano-1,2,3-trimethyl-1,4,5,6-tetrahydropyrimidinium,
3-cyanomethyl-1,2-dimethyl-1,4,5,6-tetrahydropyrimidinium,
2-cyanomethyl-1,3-dimethyl-1,4,5,6-tetrahydropyrimidinium,
4-acetyl-1,2,3-trimethyl-1,4,5,6-tetrahydropyrimidinium,
3-acetylmethyl-1,2-dimethyl-1,4,5,6-tetrahydropyrimidinium,
4-methylcarbo-oxymethyl-1,2,3-trimethyl-1,4,5,6-tetrahydropyrimidinium,
3-methylcarbo-oxymethyl-1,2-dimethyl-1,4,5,6-tetrahydropyrimidinium,
4-methoxy-1,2,3-trimethyl-1,4,5,6-tetrahydropyrimidinium,
3-methoxymethyl-1,2-dimethyl-1,4,5,6-tetrahydropyrimidinium,
4-formyl-1,2,3-trimethyl-1,4,5,6-tetrahydropyrimidinium,
3-formylmethyl-1,2-dimethyl-1,4,5,6-tetrahydropyrimidinium, 3-hydroxyethyl-1,2-dimethyl-1,4,5,6-tetrahydropyrimidinium,
4-hydroxymethyl-1,2,3-trimethyl-1,4,5,6-tetrahydropyrimidinium,
2-hydroxyethyl-1,3-dimethyl-1,4,5,6-tetrahydropyrimidinium and the like;

(Dihydropyrimidinium Cations)

1,3-dimethyl-1,4- or -1,6-dihydropyrimidinium [which are collectively expressed with "1,3-dimethyl-1,4(6)-dihydropyrimidinium", and hereinafter this expression manner being applied to in the same meaning], 1,2,3-trimethyl-1,4(6)-dihydropyrimidinium, 1,2,3,4-tetramethyl-1,4(6)-dihydropyrimidinium, 1,2,3,5-tetramethyl-1,4(6)-dihydropyrimidinium, 8-methyl-1,8-diazabicyclo[5,4,0]-7,9(10)-undecadienium, 5-methyl-1,5-diazabicyclo[4,3,0]-5,7(8)-nonadienium, 4-cyano-1,2,3-trimethyl-1,4(6)-dihydropyrimidinium, 3-cyanomethyl-1,2-dimethyl-1,4(6)-dihydropyrimidinium, 2-cyanomethyl-1,3-dimethyl-1,4(6)-dihydropyrimidinium, 4-acetyl-1,2,3-trimethyl-1,4(6)-dihydropyrimidinium, 3-acetylmethyl-1,2-dimethyl-1,4(6)-dihydropyrimidinium, 4-methylcarbo-oxymethyl-1,2,3-trimethyl-1,4(6)-dihydropyrimidinium, 3-methylcarbo-oxymethyl-1,2-dimethyl-1,4(6)-dihydropyrimidinium, 4-methoxy-1,2,3-trimethyl-1,4(6)-dihydropyrimidinium, 3-methoxymethyl-1,2-dimethyl-1,4(6)-dihydropyrimidinium, 4-formyl-1,2,3-trimethyl-1,4(6)-dihydropyrimidinium, 3-formylmethyl-1,2-dimethyl-1,4(6)-dihydropyrimidinium, 3-hydroxyethyl-1,2-dimethyl-1,4(6)-dihydropyrimidinium, 4-hydroxymethyl-1,2,3-trimethyl-1,4(6)-dihydropyrimidinium, 2-hydroxyethyl-1,3-dimethyl-1,4(6)-hydropyrimidinium and cations in which a secondary hydrogen atom of the dihydropyrimidinium-based cations described above is replaced with fluorine atom and the like;

1,3,4,6,7,8-hexahydro-1,2-dimethyl-2H-pyrimido[1,2a]pyrimidinium;

(Pyridinium Cations)

N-methylpyridinium, N-ethylpyridinium, N-n-propylpyridinium, N-n-butylpyridinium, N-methyl-4-methylpyridinium, N-ethyl-4-methylpyridinium, N-n-propyl-4-methylpyridinium, N-n-butyl-4-methylpyridinium, N-methyl-3-methylpyridinium, N-ethyl-3-methylpyridinium, N-n-propyl-3-methylpyridinium, N-n-butyl-3-methylpyridinium, N-methyl-2-methylpyridinium, N-ethyl-2-methylpyridinium, N-n-propyl-2-methylpyridinium, N-n-butyl-2-methylpyridinium, N-methyl-2,4-dimethylpyridinium, N-ethyl-2,4-dimethylpyridinium, N-n-propyl-2,4-dimethylpyridinium, N-n-butyl-2,4-dimethylpyridinium, N-methyl-3,5-dimethylpyridinium, N-ethyl-3,5-dimethylpyridinium, N-n-propyl-3,5-dimethylpyridinium, N-n-butyl-3,5-dimethylpyridinium, N-methyl-4-dimethylaminopyridinium, N-ethyl-4-dimethylaminopyridinium, N-n-propyl-4-dimethylaminopyridinium, N-n-butyl-4-dimethylaminopyridinium and the like;

(Picolinium Cation)

N-methylpicolinium, N-ethylpicolinium and the like;

(Imidazolinium-Based Cations)

1,2,3-trimethylimidazolinium,
1,2,3,4-tetramethylimidazolinium,
1,3,4-trimethyl-2-ethylimidazolinium,
1,3-dimethyl-2,4-diethylimidazolinium,
1,2-dimethyl-3,4-diethylimidazolinium,
1-methyl-2,3,4-triethylimidazolinium,
1,2,3,4-tetraethylimidazolinium,
1,3-dimethyl-2-ethylimidazolinium,
1-ethyl-2,3-dimethylimidazolinium,
1,2,3-triethylimidazolinium,
1,1-dimethyl-2-heptylimidazolinium,
1,1-dimethyl-2-(2'-heptyl)imidazolinium,
1,1-dimethyl-2-(3'-heptyl)imidazolinium,
1,1-dimethyl-2-(4'-heptyl)imidazolinium,
1,1-dimethyl-2-dodecylimidazolinium,
1,1-dimethylimidazolinium,
1,1,2-trimethylimidazolinium,
1,1,2,4-tetramethylimidazolinium,
1,1,2,5-tetramethylimidazblinium,
1,1,2,4,5-pentamethylimidazolinium,
1,2,3-trimethylimidazolinium,
1,3,4-trimethylimidazolinium,
1,2,3,4-tetramethylimidazolinium,
1,2,3,4-tetraethylimidazolinium,
1,2,3,5-pentamethylimidazolinium,
1,3-dimethyl-2-ethylimidazolinium,
1-ethyl-2,3-dimethylimidazolinium,
1-ethyl-3,4-dimethylimidazolinium,
1-ethyl-3,5-dimethylimidazolinium,
4-ethyl-1,3-dimethylimidazolinium,
1,2-diethyl-3-methylimidazolinium,
1,4-diethyl-3-methylimidazolinium,
1,5-diethyl-3-methylimidazolinium,
1,3-diethyl-2-methylimidazolinium,
1,3-diethyl-4-methylimidazolinium,
1,2,3-triethylimidazolinium,
1-ethyl-2,3,4-trimethylimidazolinium,
1-ethyl-2,3,5-trimethylimidazolinium,
2-ethyl-3,4,5-trimethylimidazolinium,
2-ethyl-1,3,4-trimethylimidazolinium,
4-ethyl-1,2,3-trimethylimidazolinium,
1,2-diethyl-3,4-dimethylimidazolinium,
1,3-diethyl-2,4-dimethylimidazolinium,
1,4-diethyl-2,3-dimethylimidazolinium,
2,4-diethyl-1,3-dimethylimidazolinium,
4,5-diethyl-1,3-dimethylimidazolinium,
3,4-diethyl-1,2-dimethylimidazolinium,
1,2,3-triethyl-4-methylimidazolinium,
1,2,4-triethyl-3-methylimidazolinium,
1,2,5-triethyl-3-methylimidazolinium,
1,3,4-triethyl-2-methylimidazolinium,
1,3,54-triethyl-5-methylimidazolinium,
1,4,5-triethyl-3-methylimidazolinium,
2,3,4-triethyl-1-methylimidazolinium,
4-cyano-1,2,3-trimethylimidazolinium,
3-cyanomethyl-1,2-dimethylimidazolinium,
2-cyanomethyl-1,3-dimethylimidazolinium,
4-acetyl-1,2,3-trimethylimidazolinium,
3-acetylmethyl-1,2-dimethylimidazolinium,
4-methylcarbo-oxymethyl-1,2,3-trimethylimidazolinium,
3-methylcarbo-oxymethyl-1,2-dimethylimidazolinium,
4-methoxy-1,2,3-trimethylimidazolinium,
3-methoxymethyl-1,2-dimethylimidazolinium,
4-formyl-1,2,3-trimethylimidazolinium,
3-formylmethyl-1,2-dimethylimidazolinium,
3-hydroxyethyl-1,2-dimethylimidazolinium,
4-hydroxymethyl-1,2,3-trimethylimidazolinium, 2-hydroxyethyl-1,3-dimethylimidazolinium and compounds in which a secondary hydrogen atom of the imidazolinium-based cations described above is replaced with fluorine atom;

(Imidazolium Cation)

1,3-dimethylimidazolium, 1-ethyl-3-methylimidazolium, 1-n-propyl-3-methylimidazolium, 1-n-butyl-3-methylimidazolium, 1,3-diethylimidazolium, 1,2,3-trimethylimidazolium, 1,2,3,4-tetramethylimidazolium, 1,3,4-trimethylimidazolium, 1,3,4-trimethyl-2-ethylimidazolium, 1,3-dimethyl- 2,4-diethylimidazolium, 1,2-dimethyl-3,4-diethylimidazolium, 1-methyl-2,3,4-triethylimidazolium, 1,2,3,4-tetraethylimidazolium, 1,3-dimethyl-2-ethylimidazolium, 1-ethyl-2,3-dimethylimidazolium, 1-n-propyl-2,3-dimethylimidazolium, 1-n-butyl-2,3-dimethylimidazolium, 1,2,3-triethylimidazolium, 1,1-dimethyl-2-heptylimidazolium, 1,1-dimethyl-2-(2'-heptyl)imidazolium, 1,1-dimethyl-2-(3'-heptyl)imidazolium, 1,1-dimethyl-2-(4'-heptyl)imidazolium, 1,1-dimethyl-2-dodecylimidazolium, 1,1-dimethylimidazolium, 1,1,2-trimethylimidazolium, 1,1,2,4-tetramethylimidazolium, 1,1,2,5-tetramethylimidazolium, 1,1,2,4,5-pentamethylimidazolium, 1-ethyl-3,4-dimethylimidazolium, 1-ethyl-3,5-dimethylimidazolium, 2-ethyl-1,3-dimethylimidazolium, 4-ethyl-1,3-dimethylimidazolium, 1,2-diethyl-3-methylimidazolium, 1,4-diethyl-3-methylimidazolium, 1,5-diethyl-3-methylimidazolium, 1,3-diethyl-2-methylimidazolium, 1,3-diethyl-4-methylimidazolium, 1,2,3-triethylimidazolium, 1,3,4-triethylimidazolium, 1-ethyl-2,3,4-trimethylimidazolium, 1-ethyl-2,3,5-trimethylimidazolium, 1-ethyl-3,4,5-trimethylimidazolium, 2-ethyl-1,3,4-trimethylimidazolium, 4-ethyl-1,2,3-trimethylimidazolium, 1,2-diethyl-3,4-dimethylimidazolium, 1,3-diethyl-2,4-dimethylimidazolium, 1,4-diethyl-2,3-dimethylimidazolium, 1,4-diethyl-2,5-dimethylimidazolium, 2,4-diethyl-1,3-dimethylimidazolium, 4,5-diethyl-1,3-dimethylimidazolium, 3,4-diethyl-1,2-dimethylimidazolium, 2,3,4-triethyl-1-methylimidazolium, 1,2,3-triethyl-4-methylimidazolium, 1,2,4-triethyl-3-methylimidazolium, 1,2,5-triethyl-3-methylimidazolium, 1,3,4-triethyl-2-methylimidazolium, 1,3,4-triethyl-5-methylimidazolium, 1,4,5-triethyl-3-methylimidazolium, 1,2,3,4-tetraethylimidazolium, 1,2,3,4,5-pentamethylimidazolium, 1-phenyl-3-methylimidazolium, 1-phenyl-3-ethylimidazolium, 1-benzyl-3-methylimidazolium, 1-benzyl-3-ethylimidazolium, 1-phenyl-2,3-dimethylimidazolium, 1-phenyl-2,3-diethylimidazolium, 1-phenyl-2-methyl-3-ethylimidazolium, 1-phenyl-2-ethyl-3-methylimidazolium, 1-benzyl-2,3-dimethylimidazolium, 1-benzyl-2,3-diethylimidazolium, 1-benzyl-2-methyl-3-ethylimidazolium, 1,3-dimethyl-2-phenylimidazolium, 1,3-diethyl-2-phenylimidazolium, 1-methyl-2-phenyl-3-methylimidazolium, 1,3-dimethyl-2-benzylimidazolium, 1,3-diethyl-2-benzylimidazolium, 1,3-dimethyl-2-ethoxymethylimidazolium, 1,3-diethyl-2-ethoxymethylimidazolium, 1-methyl-2-ethoxymethyl-3-ethylimidazolium, 1-ethoxymethyl-2,3-dimethylimidazolium, 1-ethoxymethyl-2,3-diethylimidazolium, 1-ethoxymethyl-2-methyl-3-ethylimidazolium, 1,3-dimethyl-2-methoxymethylimidazolium, 1,3-diethyl-2-methoxymethylimidazolium, 1-methyl-2-methoxymethyl-3-ethylimidazolium, 1-methoxymethyl-2,3-dimethylimidazolium, 1-methoxymethyl-2,3-diethylimidazolium, 1-methoxymethyl-2-methyl-3-ethylimidazolium, 1,3-dimethyl-2-methoxyethylimidazolium, 1,3-diethyl-2-methoxyethylimidazolium, 1-methyl-2-methoxyethyl-3-ethylimidazolium, 1-methoxyethyl-2,3-dimethylimidazolium, 1-methoxymethyl-2,3-diethylimidazolium, 1-methoxyethyl-2-methyl-3-ethylimidazolium, 1,3-dimethylbenzoimidazolium, 1,3-diethylbenzoimidazolium, 1-methyl-3-ethylbenzoimidazolium, 1,2,3-trimethylbenzoimidazolium, 1,2-dimethyl-3-ethylbenzoimidazolium, 2-cyanomethyl-1,3-dimethylimidazolium, 4-acetyl-1,2,3-trimethylimidazolium, 3-acetylmethyl-1,2-dimethylimidazolium, 4-methyl-carbo-oxymethyl-1,2,3-trimethylimidazolium, 3-methylcarbo-oxymethyl-1,2-dimethylimidazolium, 4-methoxy-1,2,3-trimethylimidazolium, 3-methoxymethyl-1,2-dimethylimidazolium, 4-formyl-1,2,3-trimethylimidazolium, 3-formylmethyl-1,2-dimethylimidazolium, 3-hydroxyethyl-1,2-dimethylimidazolium, 4-hydroxymethyl-1,2,3-trimethylimidazolium and 2-hydroxyethyl-1,3-dimethylimidazolium; and cations in which secondary hydrogen atom of the above-mentioned imidazolium-base cations is substituted with fluorine atom.

(Quinolinium Cation)
N-methylquinolinium, N-ethylquinoliniumand and the like;

(Bipyridinium Cation)
N-methyl-2,2'-bipyridinium, N-ethyl-2,2'-bipyridinium and the like;

(Other Ammonium Cations)
N-methylthiazolium, N-ethylthiazolium, N-methyloxazolium, N-ethyloxazolium, N-methyl-4-methylthiazolium, N-ethyl-4-methylthiazolium, N-ethylisothiazolium, 1,4-dimethyl-1,2,4-triazolium, 1,4-diethyl-1,2,4-triazolium, 1-methyl-4-ethyl-1,2,4-triazolium, 1-ethyl-4-methyl-1,2,4-triazolium, 1,2-dimethylpyrazolium, 1,2-diethylpyrazolium, 1-methyl-2-ethylpyrazolium, N-methylpyrazinium, N-ethylpyrazinium, N-methylpyridazinium, N-ethylpyridazinium and the like; and (Tetraalkylphosphonium Cations)
tetramethylphosphonium, ethyltrimethylphosphonium, triethylmethylphosphonium, tetraethylphosphonium, diethyldimethylphosphonium, trimethyl-n-propylphosphonium, trimethylisopropylphosphonium, ethyldimethyl-n-propylphosphonium, ethyldimethylisopropylphosphonium, diethylmethyl-n-propylphosphonium, diethylmethylisopropylphosphonium, dimethyldi-n-propylphosphonium, dimethyl-n-propylisopropylphosphonium, dimethyldiisopropylphosphonium, triethyl-n-propylphosphonium, n-butyltrimethylphosphonium, isobutyltrimethylphosphonium, t-butyltrimethylphosphonium, triethylisopropylphosphonium, ethylmethyldi-n-propylphosphonium, ethylmethyl-n-propylisopropylphosphonium, ethylmethyldiisopropylphosphonium, n-butylethyldimethylphosphonium, isobutylethyldimethylphosphonium, t-butylethyldimethylphosphonium, diethyldi-n-propylphosphonium, diethyl-n-propylisopropylphosphonium, diethyldiisopropylisopropylphosphonium, methyltri-n-propylphosphonium, methyldi-n-propylisopropylphosphonium, methyl-n-propyldiisopropylphosphonium, n-butyltriethylphosphonium, isobutyltriethylphosphonium, t-butyltriethylphosphonium, di-n-butyldimethylphosphonium, diisobutyldimethylphosphonium, di-t-butyldimethylphosphonium, n-butylisobutyldimethylphosphonium, n-butyl-t-butyldimethylphosphonium, isobutyl-t-butyldimethylphosphonium, tri-n-octylmethylphosphonium, ethyltri-n-octylphosphonium and the like.

Among them, it is preferable to enhance the electrostatic capacity per unit volume that the imidazolium cation is 1-ethyl-3-methylimidazolium (EMI$^+$) represented by the formula (2).

(2)

The organic anion is an anion containing hydrocarbon group optionally having substituent, for example, includes an anion selected from the group consisting of $N(SO_2R_f)_2^-$, $C(SO_2R_f)_3^-$, $R_fCOO^-$ and $R_fSO_3^-$ (wherein $R_f$ represents perfluoroalkyl group having 1 to 12 carbon atoms) and anions in which an active hydrogen is eliminated from the following organic acids (carboxylic acids, organic sulfonic acids and organic phosphoric acids) or phenols.

(Carboxylic Acids)

For example, two to four valent polycarboxylic acids having 2 to 15 carbon atoms such as aliphatic polycarboxylic acids [saturated polycarboxylic acids (oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, methylmalonic acid, ethylmalonic acid, propylmalonic acid, butylmalonic acid, pentylmalonic acid, hexylmalonic acid, dimethylmalonic acid, diethylmalonic acid, methylpropylmalonic acid, methylbutylmalonic acid, ethylpropylmalonic acid, dipropylmalonic acid, methylsuccinic acid, ethylsuccinic acid, 2,2-dimethylsuccinic acid, 2,3-dimethylsuccinic acid, 2-methylglutaric acid, 3-methylglutaric acid, 3-methyl-3-ethylglutaric acid, 3,3-diethylglutaric acid, methylsuccinic acid, 2-methylglutaric acid, 3-methylglutaric acid, 3,3-dimethylglutaric acid, 3-methyladipic acid and the like); and unsaturated polycarboxylic acids (cyclobutene-1,2-dicarboxylic acid, 4-methylcyclobutene-1,2-dicarboxylic acid, cyclopentene-1,2-dicarboxylic acid, 5-methyl-cyclopentene-1,2-dicarboxylic acid, bicyclo[2,2,1]hepta-2-en-2,3-dicarboxylic acid, 1-methyl-bicyclo[2,2,1]hepta-2-en-2,3-dicarboxylic acid, 6-methyl-bicyclo[2,2,1]hepta-2-en-2,3-dicarboxylic acid, bicyclo[2,2,1]hepta-2,5-diene-2,3-dicarboxylic acid, 1-methyl-bicyclo[2,2,1]hepta-2,5-diene-2,3-dicarboxylic acid, 6-methyl-bicyclo[2,2,1]hepta-2,5-diene-2,3-dicarboxylic acid, furan-2,3-dicarboxylic acid, 5-methyl-furan-2,3-dicarboxylic acid, 4-methyl-furan-2,3-dicarboxylic acid, 4,5-dihydroxy-furan-2,3-dicarboxylic acid, 4,5-dihydroxy-4-methyl-furan-2,3-dicarboxylic acid, 4,5-dihydroxy-5-methyl-furan-2,3-dicarboxylic acid, 2,5-dihydroxy-furan-3,4-dicarboxylic acid, 2,5-dihydroxy-2-methyl-furan-3,4-dicarboxylic acid and the like; of these, preferable being cyclobutene-1,2-dicarboxylic acid, 4-methyl-cyclobutene-1,2-dicarboxylic acid, cyclopentene-1,2-dicarboxylic acid, 5-methyl-cyclopentene-1,2-dicarboxylic acid, bicyclo[2,2,1]hepta-2-en-2,3-dicarboxylic acid, bicyclo [2,2,1]hepta-2,5-diene-2,3-dicarboxylic acid, furan-2,3-dicarboxylic acid, 5-methyl-furan-2,3-dicarboxylic acid, 4-methyl-furan-2,3-dicarboxylic acid, 5-methyl-2,3-furandicarboxylic acid, 4,5-dihydroxy-furan-2,3-dicarboxylic acid, 2,5-dihydroxy-furan-3,4-dicarboxylic acid, maleic acid, fumaric acid, itaconic acid, citraconic acid, 1,2-cyclobutadiene-1,2-dicarboxylic acid, 4-methyl-1,2-cyclobutadiene-1,2-dicarboxylic acid, 1,2-cyclopentadiene-1,2-dicarboxylic acid, 5-methyl-1,2-cyclopentadiene-1,2-dicarboxylic acid, 1,2-cyclohexadiene-1,2-dicarboxylic acid, 6-methyl-1,2-cyclohexadiene-1,2-dicarboxylic acid, 5-methyl-1,2-cyclohexadiene-1,2-dicarboxylic acid, furan-3,4-dicarboxylic acid and 2-methyl-furan-3,4-dicarboxylic acid; of these more preferable being 1,2-cyclobutadiene-1,2-dicarboxylic acid, 4-methyl-1,2-cyclobutadiene-1,2-dicarboxylic acid, 1,2-cyclopentadiene-1,2-dicarboxylic acid, 5-methyl-1,2-cyclopentadiene-1,2-dicarboxylic acid, furan-3,4-dicarboxylic acid and 2-methyl-3,4-furandicarboxylic acid)], aromatic polycarboxylic acids [phthalic acid, isophthalic acid, terephthalic acid, trimellitic acid, pyromellitic acid and the like] and polycarboxylic acids containing sulfur atom [thiodipropionic acid and the like];

oxycarboxylic acids having 2 to 20 carbon atoms such as aliphatic oxycarboxylic acids [glycolic acid, lactic acid, tartaric acid, castor oil fatty acid and the like]; and aromatic oxycarboxylic acids [salicylic acid, mandelic acid, 4-hydroxybenzoic acid, 1-hydroxy-2-naphthoic acid, 3-hydroxy-2-naphthoic acid, 6-hydroxy-2-naphthoic acid and the like]; and monocarboxylic acids having 1 to 30 carbon atoms such as aliphatic monocarboxylic acids [saturated monocarboxylic acids (formic acid, acetic acid, propionic acid, butyric acid, isobutyric acid, valeric acid, capric acid, enanthic acid, capric acid, pelargonic acid, lauric acid, myristic acid, stearic acid, behenic acid, undecanoic acid and the like), unsaturated monocarboxylic acids (acrylic acid, methacrylic acid, crotonic acid, oleic acid, squaric acid, 4,5-dihydroxy-4-cyclopentene-1,3-dione, 2,3-dihydroxy-2-cyclohexene-1,4-dione and the like)]; and aromatic monocarboxylic acids [benzoic acid, cinnamic acid, naphthoic acid, toluic acid, ethylbenzoic acid, propylbenzoic acid, isopropylbenzoic acid, butylbenzoic acid, isobutylbenzoic acid, secondary-butylbenzoic acid, tertiary-butylbenzoic acid, hydroxybenzoic acid, ethoxybenzoic acid, propoxybenzoic acid, isopropoxybenzoic acid, butoxybenzoic acid, isobutoxybenzoic acid, secondary-butoxybenzoic acid, tertiary-butoxybenzoic acid, aminobenzoic acid, N-methylaminobenzoic acid, N-ethylaminobenzoic acid, N-propylaminobenzoic acid, N-isopropylaminobenzoic acid, N-butylaminobenzoic acid, N-isobutylaminobenzoic acid, N-secondary-butylaminobenzoic acid, N-tertiary-butylaminobenzoic acid, N,N-dimethylaminobenzoic acid, N,N-diethylaminobenzoic acid, nitrobenzoic acid, florobenzoic acid and the like].

(Phenols)

For example, monophenols (including phenols and naphthols): phenol, alkyl(1 to 15 carbon atoms) phenols (cresol, xylenol, ethylphenol, n- or iso-propylphenol, isododecylphenol and the like), methoxyphenols (eugenol, guaiacol and the like), a-naphthol, β-naphthol, cyclohexylphenol and the like); and polyphenols: catechol, resorcin, pyrogallol, phloroglucine, bisphenol A, bisphenol F, bisphenol S and the like.

(Phosphates Having in its Molecule 1 or 2 Alkyl Groups Having 1 to 15 Carbon Atoms)

For example, mono- and di-methylphosphate, mono- and di-isopropylphosphate, mono- and di-butylphosphate, mono- and di-(2-ethylhexyl)phosphate, mono- and di-isodecylphosphate and the like.

(Organic Sulfonic Acids)

For example, alkyl(1 to 15 carbon atoms)benzenesulfonic acids (p-toluenesulfonic acid, nonylbenzenesulfonic acid, dodecylbenzenesulfonic acid and the like), sulfosalicylic acid, methanesulfonic acid, trifloromethanesulfonic acid and the like.

(Organic Acids Having Triazole- or Tetrazole-Based Structure)

For example, 1-H-1,2,4-triazole, 1,2,3-triazole, 1,2,3-benzotriazole, carboxybenzotriazole, 3-mercapto-1,2,4-triazole, 1,2,3-triazole-4,5-dicarboxylic acid, 3-mercapto-5-methyl-1,2,4-triazole, 1,2,3,4-tetrazole and the like.

(Organic Acids Containing Boron Atom)

borodioxalate, borodiglycolate, borodi(2-hydroxyisobutyrate), alkane borates, aryl borates, methane borate, ethane borate, phenyl borates and the like.

Anions represented by the following formula

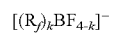

wherein k represents an integer of 1 to 4 and $R_f$ represents the same meaning mentioned above.

trifluoromethyltrifluoro borate,
bis(trifluoromethyl)difluoro borate,
tris(trifluoromethyl)fluoro borate,
tetrakis(trifluoromethyl) borate,
pentafluoroethyltrifluoro borate,
bis(pentafluoroethyl)difluoro borate,
tris(pentafluoroethyl)fluoro borate, tetrakis(pentafluoroethyl) borate and the like.

Anions represented by the following formula

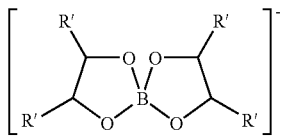

wherein R' represents hydrocarbon group having 1 to 10 carbon atoms which optionally has hydroxyl group, amino group, nitro group, cyano group, chloro group, fluoro group, formyl group or a group having ether bonding, or hydrogen atom or fluorine atom; each of R's may be same or different and R's may form a ring by binding with alkylene group each other.

Anions represented by the following formula

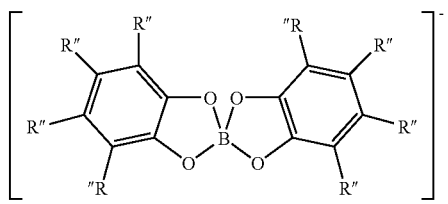

wherein R" represents the same meaning as R'; each of R"s may be same or different and R"s may form a ring by binding with hydrocarbon group each other.

Anions represented by the following formulas

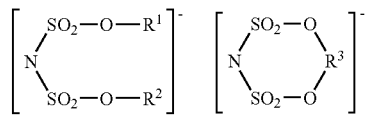

wherein $R^1$ and $R^2$ represent monovalent organic group having 1 to 4 carbon atoms containing fluorine atom; $R^1$ and $R^2$ may be same or different and $R^3$ represents divalent organic group having 2 to 8 carbon atoms containing fluorine atom.

As anions, preferable are inorganic anions, more preferable are $BF_4^-$, $AsF_6^-$, and $SbF_6^-$, further more preferable is $BF_4^-$ due to its tendency to enhance electrostatic capacity.

Solvents used for the electrolytic solution containing an electrolyte include water and/or organic polar solvents. As the electrolytic solution containing an inorganic-base electrolyte, only water is usually used as a solvent; otherwise, a solvent mainly containing water or a mixture of water and the above-mentioned hydrophilic organic solvent may be used. As the electrolytic solution containing an organic electrolyte, a solvent mainly containing an organic polar solvent is used; and water content of the electrolytic solution containing organic-base electrolytes is usually 200 ppm or less, preferably 50 ppm or less, and more prefer-ably 20 ppm or less. By suppression of the water content, influence on the electrode due to water electrolysis, especially reduction of voltage endurance can be avoided.

Specific examples of the organic polar solvents are exemplified as follows:

(Ethers)

monoethers (ethyleneglycol monomethylether, ethyleneglycol monoethylether, diethyleneglycol monomethylether, diethyleneglycol monoethylether, ethyleneglycol monophenylether, tetrahydrofuran, 3-methyltetrahydrofuran, and the like); diethers (ethyleneglycol dimethylether, ethyleneglycol diethylether, diethyleneglycol dimethylether, diethyleneglycol diethylether, diethylether, methylisopropylether, and the like); triethyleneglycol dimethylether, ethyleneglycol monomethylether acetate, cyclic ethers [cyclic ethers having 2 to 4 carbon atoms (tetrahydrofuran, 2-methyltetrahydrofuran, 1,3-dioxolane, 1,4-dioxane, 2-methyl-1,3-dioxolane, and the like); 4-butyldioxolane and crown ether having 5 to 18 carbon atoms);

(Fluorinated Dioxolanes)
2,2-di(trifluoromethyl)-1,3-dioxolane,
2,2-di(trifluoromethyl)-4,5-difluoro-1,3-dioxolane,
2,2-di(trifluoromethyl)-4,4,5,5-tetrafluoro-1,3-dioxolane,
2,2-dimethyl-4,4,5,5-tetrafluoro-1,3-dioxolane or
2,2-dimethyl-4,5-difluoro-1,3-dioxolane;

(Amides)

formamides (N-methylformamide, N,N-dimethylformamide, N-ethylformamide,N,N-diethylformamide, and the-like); acetamides (N-methylacetamide, N,N-dimethylacetamide, N-ethylacetamide,N,N-diethylacetamide, and the like); propionamides(N,N-dimethylpropionamide and the like), hexamethylphosphorylamide; oxazolidinones (N-methyl-2-oxazolidinone, 3,5-dimethyl-2-oxazolidinone, and the like); 1,3-dimethyl-2-imidazolidinone, and N-methylpyrrolidone;

(Nitriles)

acetonitrile, glutaronitrile, adiponitrile, methoxyacetonitrile, 3-methoxypropionitrile, acrylonitrile and fluorine-contained propionitriles in which at least one hydrogen atom of propionitrile is substituted with fluorine atom(s);

(Carboxylates)

methyl formate, ethyl formate, methyl acetate, ethyl acetate, propyl acetate, methyl propionate, methyl butyrate, methyl valerate, ethyl propionate, dimethyl malonate, diethyl malonate, and the like; and maleic anhydride and derivatives thereof;

(Lactones)

γ-butyrolactone, 3-methyl-γ-butyrolactone, 2-methyl-γ-butyrolactone, α-acetyl-γ-butyrolactone, β-butyrolactone, γ-valerolactone, 3-methyl-γ-valerolactone, δ-valerolactone, and the like;

(Carbonates)

ethylene carbonate, propylene carbonate, butylene carbonate, vinylene carbonate, dimethylcarbonate, methylethylcarbonate, methylpropylcarbonate, methylisopropylcarbonate, diethylcarbonate, 4-allyloxymethyl-1,3-dioxolane-2-one, 4-(1'-propenyloxymethyl)-1,3-dioxolane-2-one, 4-allyloxymethyl-5-vinyl-1,3-dioxolane-2-one, 4-(1'-propenyloxymethyl)-5-vinyl-1,3-dioxolane-2-one, 4-acryloyloxymethyl-1,3-dioxolane-2-one, 4-methacryloyloxymethyl-1,3-dioxolane-2-one, 4-methacryloyloxymethyl-5-vinyl-1,3- dioxolane-2-one, 4-methoxycarbonyloxymethyl-1,3-dioxolane-2-one, 4-allyloxycarbonyloxymethyl-1,3-dioxolane-2-one, 4-vinylethylene carbonate, 4,5-divinylethylene carbonate, 4,4,5,5-tetramethyl-1,3-dioxolane-2-one, 4,4,5,5-tetraethyl-1,3-dioxolane-2-one, vinylene carbonate, 4-methylvinylene carbonate, 4,5-dimethylvinylene carbonate, 5,5-dimethyl-1,3-dioxane-2-one and 5,5-diethyl-1,3-dioxane-2-one; dipropylcarbonate, methylbutylcarbonate, ethylbutylcarbonate, ethylpropylcarbonate, butylpropylcarbonate and compounds of which at least one hydrogen atom is substituted with fluorine atom(s);

(Sulfoxides)
dimethylsulfoxide, sulfolane, 3-methylsulfolane, 2,4-dimethylsulfolane, fluorine-contained sulfolanes in which at least one hydrogen atom of sulfolane is substituted with fluorine atom(s), and the like; 1,3-propanesultone, 1,4-butanesultone, compounds of which at least one hydrogen atom is substituted with fluorine atom(s), and the like;

(Sulfone)
dimethylsulfone, diethylsulfone, di-n-propylsulfone, di-isopropylsulfone, di-n-butylsulfone, di-sec-butylsulfone, di-tert-butylsulfone, and the like;

(Nitro Compounds)
nitromethane, nitroethane, and the like;

(Other Heterocyclic Compounds)
N-methyl-2-oxazolidinone,
3,5-dimethyl-2-oxazolidinone,
1,3-dimethyl-2-imidazolidinone, N-methylpyrrolizinone, and the like;

(Monohydric Alcohols)
monohydric alcohols having 1 to 6 carbon atoms (methyl alcohol, ethyl alcohol, propyl alcohol, butyl alcohol, diacetone alcohol, furfuryl alcohol, and the like): and monohydric alcohols having 7 carbon atoms or more (benzyl alcohol, octyl alcohol, and the like);

(Polyhydric Alcohols)
dihydric alcohols having 1 to 6 carbon atoms (ethyleneglycol, propyleneglycol, diethyleneglycol, hexyleneglycol, and the like); dihydric alcohols having 7 carbon atoms or more (octyleneglycol and the like); trihydric alcohols (glycerin and the like) and hexahydric alcohols (hexytol and the like);

(Hydrocabons)
aromatic solvents (toluene, xylene, ethylfluorobenzene, fluorobenzenes in which 1 to 6 hydrogen atoms of a benzene ring are substituted with fluorine atom(s), and the like); and paraffinic solvents (normal paraffin isoparaffin, and the like); and (Silicon Compounds)
compounds having silicon atom(s) in the molecule thereof such as; oxazolidinone compounds such as 3-trimethylsilyl-2-oxazolidinone, 3-trimethylsilyl-4-trifluoromethyl-2-oxazolidinone, and 3-triethylsilyl-2-oxazolidinone; imidazole compounds such as N-trimethylsilylimidazole, N-trimethylsilyl-4-methylimidazole and N-triethylsilylimidazole; phosphate compounds such as tris(trimethylsilyl)phosphate, tris(triethylsilyl)phosphate, trimethylsilyl dimethylphosphate and trimethylsilyl diallylphosphate; cyclic carbonates such as 4-trimethylsilyl-1,3-dioxolane-2-one, 4-trimethylsilyl-5-vinyl-1,3-dioxolane-2-one and 4-trimethylsilylmethyl-1,3-dioxolane-2-one; phenyl compounds such as phenyltrimethylsilane, phenyltriethylsilane, phenyltrimethoxysilane, phenylthiotrimethylsilane and phenylthiotriethylsilane; carbamate compounds such as methyl-N-trimethylsilylcarbamate, methyl-N,N-bistrimethylsilyl carbamate, ethyl-N-trimethylsilyl carbamate, methyl-N-triethylsilyl carbamate and vinyl-N-trimethylsilyl carbamate; carbonate compounds such as methyltrimethylsilyl carbonate, allyltrimethylsilyl carbonate and ethyltrimethylsilyl carbonate; methoxytrimethylsilane, hexamethyldisiloxane, pentamethyldisiloxane; methoxymethyltrimethylsilane, trimethylchlorosilane, butyldiphenylchlorosilane, trifluoromethyltrimethylsilane, acetyltrimethylsilane, 3-trimethylsilylcyclopentene, allyltrimethylsilane, vinyltrimethylsilane and hexamethyldisilazane.

The polar organic solvents dissolving the electrolytes may be a mixture of two different kinds or more thereof.

The polar organic solvent contained in the electrolytic solution is preferably a solvent mainly containing at least one compound selected from the group consisting of carbonates, lactones, and sulfoxides; more preferably mainly containing at least one compound selected from the group consisting of propylene carbonate, ethylene carbonate, butylene carbonate, sulfolane, 3-methylsulfolane, acetonitrile, dimethyl carbonate, ethylmethyl carbonate, γ-butyrolactone, ethylene glycol, and diethyl carbonate; and further preferably mainly containing at least one compound selected from the group consisting of ethylene carbonate, propylene carbonate, γ-butyrolactone, and sulfolane.

Herein, the term "mainly containing" defines that the compound(s) occupies usually 50% by weight or more of the weight of the solvent, and preferably 70% by weight or more. The more the polar organic solvent is contained, the more long-term durability and operating voltage of the capacitor are enhanced.

To the electrolytic solution, various additives can be added depending on requirements. The additives specifically include, in order to suppress gas generation and enhance voltage endurance, phosphates (such as trimethyl phosphate, triethyl phosphate-, and triallyl phosphate); and, in order to achieve high capacity and output, fluorine-contained organic silicon compounds represented by the following formula:

$$CF_3CH_2CH_2Si(CH_3)_3,$$

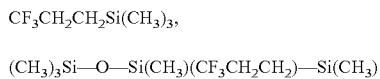

In views of electric conductivity of the electrolyte and solubility to the solvent of the electrolytic solution, the phosphate is added usually in an amount of about 10% by weight or less of the electrolyte, and the fluorine-contained organic silicon compound is added in an amount of about 0.1 to 5% by weight of the electrolytic solution.

Benzoic acids [alkyl benzoates such as methyl benzoate, ethyl benzoate, and propyl benzoate, benzoic acid, and the like], being one kind of polar organic solvents, can be used as an additive for preventing metal elution from current collector. When the benzoic acid is used as an additive, it is used usually about 0.001 to 10.0% by weight of the electrolyte, preferably 0.005 to 5% by weight, more preferably 0.1 to 1% by weight.

Concentration of the organic electrolyte in the electrolytic solution containing an organic polar solvent is usually about 0.5 to 5.0 moles (electrolyte)/L (electrolytic solution), and preferably 0.7 to 3.0 moles (electrolyte)/L (electrolytic solution). It is preferable that, when dissolving the electrolyte of 0.5 mole/L or more, electrostatic capacity tends to increase; and, when dissolving 5.0 moles/L or less, viscosity tends to decrease.

The electric double-layer capacitor is charged by applying current of usually about 5 mA/g to 10 A/g, preferably 10 mA/g to 5 A/g. It is preferable that, when applying the current of 5 mA/g or more, charging rate tends to be enhanced; and, when applying the current of 10 A/g or less, reduction of electrostatic capacity tends to be suppressed.

Besides, the electric double-layer capacitor of the present invention causes little reduction of electrostatic capacity even if being repeatedly subjected to quick charging/discharging at a current of 1 A/g or more.

The electric double-layer capacitor of the present invention is an electric double-layer capacitor having an excellent electrostatic capacity such that the electrostatic capacity per unit volume of the activated carbon is usually 15 F/ml or more, and preferably 18 F/ml or more; besides, having excellent electric characteristics such that the electrostatic capacity per unit weight of the activated carbon is usually 19 F/g or more, and preferably 24 F/g or more.

An electric double-layer capacitor of the present invention comprises an electrode and an electrolytic solution, wherein said electrolytic solution is 1 mole/L of the propylene carbonate solution of tetraethylammonium $BF_4$ salt and said electrode is obtained by kneading a mixture of 80 parts by weight of an active carbon having a total pore volume of less than 0.95 ml/g, 10 parts by weight of acetylene black and 10 parts by weight of polytetrafluoroethylene, molding the kneaded mixture in the form of a sheet having a thickness of 0.28 mm, and drying the molded one to obtain positive and negative electrodes, in this case the electrostatic capacity per unit volume of the activated carbon is usually 15 F/ml or more.

Furthermore, the electric double-layer capacitor of the present invention has other excellent electric characteristics: when charging/discharging it at a constant current (300 mA, 0 to 2.3 V) and letting the value of its electrostatic capacity obtained be 100, the capacitor little reduces its electrostatic capacity even if being subjected to quick charging/discharging; and, when 3 moles/L of propylene carbonate solution of 1-ethyl-3-methylimidazolium $BF_4$ salt being used as an electrolytic solution, the reduction of its electrostatic capacity is contained usually less than 5%, and preferably 3% or less even if being subjected to quick charging/discharging at a current of 4000 mA/g.

The electric double-layer capacitor including the electrode having the activated carbon of the present invention remarkably enhances both of electrostatic capacity per unit volume and electrostatic capacity per unit weight. The capacitor also has low resistance value at discharging, suppresses heat generation, and hardly reduces the electrostatic capacity thereof under repeating quick charging/discharging; and furthermore, seldom reduces the electrostatic capacity thereof under preservation at a high temperature such as about 70° C. after being enough charged.

EXAMPLES

The present invention is explained in detail based on Examples, but it is needless to say that the scope of the present invention is not limited to these Examples.

Example 1

Synthetic Example of Compound (1)

Production of tetramethylcalix[4]resorcinarene (Compound (1): MCRA)

To four-neck flask, were added 30.0 g of resorcinol, 120 ml of ethanol, and 12.1 g of acetaldehyde under nitrogen stream, the mixture was cooled with ice and dropped with 53.7 g of 36% hydrochloric acid under stirring. After completion of dropping, the mixture was heated up to 65° C. and then kept at the same temperature for 5 hours. The reaction mixture obtained was added with 3.20 g of water to precipitate; the precipitated was collect by filtration, washed with water until filtrate exhibiting neutral, and then dried; thereafter, being subjected to re-crystallization from a mixed solution of water and ethanol to give 13.1 g of tetramethylcalix[4]resorcinarene (MCRA)

Result of mass spectrometry of MCRA (FD-MS) m/z 544
Results of $^1$HNMR spectrometry of MCRA (DMSO-$d^6$): δ 1.29 (s, 12H), 4.45 (q, 4H), 6.14 (s, 4H), 6.77 (s, 4H), 8.53 (s, 8H)

Production Example of Activated Carbon

MCRA was calcined (carbonized) at 1000° C. for 4 hours under argon atmosphere, and then calcined (activated) at 1000° C. for 2 hours in the presence of carbon dioxide; followed by crushing by a ball mill (agate ball, 28 rpm, 5 minutes). Since this activated carbon did not contact to metals, no metal, including metal ions was substantially contaminated therein.

The calculated total pore volume of the activated carbon obtained was 0.68 ml/g, the calculated micropore volume was 0.43 ml/g and the calculated mesopore volume was 0.25 ml/g.

The total pore volume was calculated from an amount of nitrogen absorbed at around 0.95 relative pressure and the micropore was calculated at around 0.30 relative pressure in a absorption isotherm determined at a temperature of liquid nitrogen by AUTOSORB (manufactured by Yuasa Ionics Inc.).

Production Example of Electrode and Electric Double-Layer Capacitor

After kneading a mixture of 80 parts by weight of the activated carbon obtained above, 10 parts by weight of acetylene black (manufactured by DENKI KAGAKU KOGYO K. K., Denkablack 50%, a pressed product), and 10 parts (as solid content) by weight of polytetrafluoroethylene (an aqueous dispersion having content of about 60% by weight), the mixture was molded in a sheet having thickness of 0.28 mm and dried to obtain electrodes. After inserting a cellulose sheet for condenser (thickness of 50 μm) as a separator between the two electrode obtained, 1 mole/L of propylene carbonate solution of tetraethylammonium $BF_4$ salt (organic electrolyte) was filled to form a bipolar electric double-layer capacitor (FIG. 5).

The capacitor was subjected to a constant current charging/discharging measurement (300 mA/g, 0 to 2.8 V), resulting in 16.3 F/ml of electrostatic capacity per unit volume of the activated carbon and 24.7 F/g of electrostatic capacity per unit weight of the activated carbon.

Electrostatic capacity per unit volume of the activated carbon is calculated by multiplying a density (g/cc) by electrostatic capacity per unit weight (F/g), wherein the density (g/cc) of a molded article having a diameter of 13 φ obtained by kneading a mixture of 80 parts by weight of the activated carbon and 10 parts by weight of polytetrafluoroethylene (about 60% by weight aqueous dispersion) and molding the mixture under the condition at a pressure of 162 kgf/cm², and the electrostatic capacity per unit weight (F/g) of the molded article is calculated using a discharging curve obtained by charging a constant current at 300 mA/g up to 2.8 V and discharging with TOSCAT-3100 charge and discharge evaluation device manufactured by Toyo System K.K.

Examples 2 to 8

Examples were conducted according to the same manner of Example 1 except for applying the compounds (1), calcining times for activation, quantities of electricity for a constant current charging/discharging measurement listed in Table 1. The results are shown in Table 1 together with that of Example 1.

TABLE 1

| Example | Compound (1) | | | | Activation Time (h) | Total Pore Volumn (ml/g) | Micropore Volumn (ml/g) | Current Value (mA/g) | Electrostatic Capacity | |
|---|---|---|---|---|---|---|---|---|---|---|
| | n | R | m/z | $^1$H NMR ($\delta$) | | | | | (F/cc) | (F/g) |
| 1 | 4 | —CH$_3$ | 544 | 1.29 (s, 12H), 4.45 (q, 4H), 6.14 (s, 4H), 6.77 (s, 4H), 8.53 (s, 8H) | 2 | 0.68 | 0.49 | 300 | 16.3 | 24.7 |
| 2*1 | 4 | —CH$_3$ | 544 | 0.73~1.40 (m, 12H), 4.31~4.79 (s, 4H), 6.10~6.80 (m, 4H), 6.77~6.80 (m, 4H), 8.40~8.91 (m, 8H) | 2 | 0.74 | 0.53 | 300 | 18.6 | 24.2 |
| 3 | 4 | 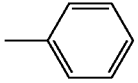 | 792 | 5.52~5.63 (m, 4H), 6.11~6.96 (m, 24H), 8.43~5.84 (m, 8H) | 4 | 0.8 | 0.68 | 100 | 19.1 | 28.9 |
| 4 | 4 | 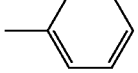 | 792 | | 6 | 0.88 | 0.72 | 100 | 17.9 | 32 |
| 5*2 | 4 | 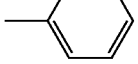 | 792 | | 4 | 0.76 | 0.62 | 300 | 24.3 | 28.2 |
| 6 | 4 | 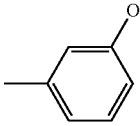 | 856 | 5.47~5.52 (m, 4H), 5.85~6.79 (m, 28H), 8.43~8.45 (m, 8H), 8.63~8.70 (m, 4H) | 2 | 0.75 | 0.69 | 100 | 16.3 | 25.1 |
| 7*3 | 4 | 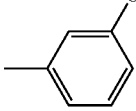 | 856 | | 2 | 0.51 | 0.47 | 30 | 15.9 | 19.1 |
| 8 | 4 | 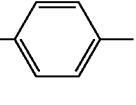 | 856 | 5.42~5.51 (m, 4H), 5.91~6.63 (m, 28H), 8.33~8.41 (m, 8H), 8.64~8.81 (m, 4H) | 2 | 0.9 | 0.58 | 100 | N.E. | 26.1 |
| 9*4 | 4 | 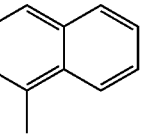 | 992 | 5.16~7.52 (m, 40H), 8.38~8.75 (m, 8H) | 4 | 0.64 | 0.60 | 300 | 23.8 | 26.1 |

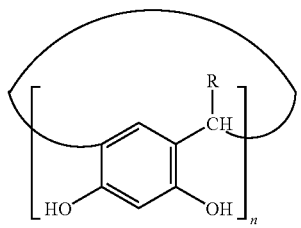

(1)

*1 In producing the compound (1), a mixed solvent of 60 ml of methanol and 60 ml of water was used in place of 120 ml of ethanol used in Example 1, and re-crystallization was not conducted.
A mixture of stereoisomers were used as the compound (1).
*2 The volume average particle diameter was about 5 μm determined by Laser Diffraction Type Particle Size TABLE 1-continued

| | Compound (1) | | | | Activation Time (h) | Total Pore Volumn (ml/g) | Micro-pore Volumn (ml/g) | Current Value (mA/g) | Electrostatic Capacity | |
|---|---|---|---|---|---|---|---|---|---|---|
| Example | n | R | m/z | $^1$H NMR (δ) | | | | | (F/cc) | (F/g) |

Distribution Analyzer model SALD-2000J (Trade name, manufactured by Shimadzu Co.). The accumulated particle distribution of the activated carbon is shown in Table 2.
[*3]The activated carbon was obtained by carbonizing the compound (1) at 300° C. for 1 hour in air, calcining (carbonizing) at 1000° C. for 4 hours under argon atmosphere, and then calcining (activating) at 1000° C. for 2 hours in the presence of carbon dioxide.
[*4]In the production of the activated carbon, calcining for 4 hours in the presence of carbon dioxide (carbonizing and activating) was performed.

TABLE 2

| μm (equal or less) | ≦1 | ≦2 | ≦3 | ≦4 | ≦5 | ≦6 | ≦7 | ≦8 | ≦10 | ≦13 | ≦15 | ≦19 | ≦23 | ≦28 |
|---|---|---|---|---|---|---|---|---|---|---|---|---|---|---|
| Accumulated Particle Amount (vol %) | 6 | 14 | 27 | 34 | 43 | 52 | 61 | 70 | 78 | 86 | 92 | 96 | 98 | 100 |

Examples 9 and 10

Production Example of Electric Double-layer Capacitor Containing Inorganic Electrolyte Examples were conducted according to the same manner of Example 1 except for applying the compounds (1) listed in Table 2, and 1 mole/L of aqueous sulfuric acid in place of 1 mole/L of the propylene carbonate solution of tetraethylammonium BF$_4$ salt. The results are shown in Table 3.

TABLE 3

| | Compound (1) | | | | Activation Time (h) | Total Pore Volumn (ml/g) | Current Value (mA/g) | Electrostatic Capacity | |
|---|---|---|---|---|---|---|---|---|---|
| Example | n | R | m/z | $^1$H NMR (δ) | | | | (F/cc) | (F/g) |
| 10 | 4 | —CH$_3$ | 544 | 0.73~1.40 (m, 12H), 4.31~4.79 (m, 4H), 6.10~6.80 (m, 4H), 8.40~8.91 (m, 8H) | 2 | 0.62 | 300 | 26.1 | 39.6 |
| 11 | 4 | 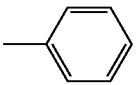 | 792 | 5.52~5.63 (m, 4H), 6.11~6.96 (m, 24H), 8.43~8.50 (m, 8H) | 4 | 0.65 | 300 | 26.5 | 40.1 |

Example 11

Reduction of Electrostatic Capacity Caused by Quick Charging/Discharging

After inserting a cellulose sheet for condenser as a separator between the two electrodes obtained in Example 3, 3 mole/L of propylene carbonate solution of 1-ethyl-3-methylimidazolium BF$_4$ salt (organic electrolyte) was filled to form a bipolar system electric double-layer capacitor (B).

The capacitor was charged with a constant current of 3000 mA/g for 1 minute, and then discharged for 1 minute. The electrostatic capacity thereof after the first charging/discharging was 32 F/g. This procedure was further repeated in 4 times, and the electrostatic capacity thereof at the fifth time was 32 F/g, resulting in no reduction of the storage capacity of current after being repeatedly conducted in five times with quick charging/discharging.

The electrostatic capacities per unit volume of the electric double-layer capacitor (B) mentioned above were determined by a constant current charging/discharging measurement (1000 to 8000 mA/g), and the measured values were respectively expressed in percentage when the electrostatic capacity determined by a constant current charging/discharging measurement at 300 mA/g was as 100%. The results are shown in Table 4. The electric double-layer capacitor (A) was almost same as electric double-layer capacitor (B) except for being filled with 1 mole/L of the propylene carbonate solution of tetraethylammonium $BF_4$ salt (organic electrolyte) was subjected to the same measurement as in the capacitor (B), and the measured values were also respectively expressed in percentage by the same manner as in the capacitor (B). The results are together shown in Table 4.

It is understood that, even at the quick charging/discharging, the values of electrostatic capacity are almost same as that of the constant current charging/discharging.

A current application characteristics was evaluated for the electric double-layer capacitor (B) according to the same manner that the capacitor (B) was kept at a temperature of 70° C. for 300 hours and then subjected to a constant current charging/discharging measurement (300 mA/g, 0 to 2.3 V). The electrostatic capacities per unit volume and weight were retained in 86% respectively based on the value of the initial constant current charging/discharging measurement at 300 mA/g.

The electrolytic solution of the (B): 3 mole/L of propylene carbonate solution of 1-ethyl-3-methylimidazolium $BF_4$ salt (organic electrolyte)

Comparative Examples 1 to 4

Comparative Examples 1 to 3 were conducted by using the compounds (1) listed in Table 5 according to the same manner as in Example 1 except for not conducting activation processing. The results are shown in Table 5.

Comparative Example 4 was conducted by preparing a resorcin-formaldehyde resin according to Patent Literature 1, carbonizing and activating said resin to obtain an activated carbon, and then using said activated carbon. The results of this example are also shown in Table 5.

TABLE 5

| Comparative Example | Compound (1) | | | | Activation Time (h) | Total Pore Volumn (ml/g) | Current Value (mA/g) | Electrostatic Capacity | |
|---|---|---|---|---|---|---|---|---|---|
| | n | R | m/z | $^1$H NMR (δ) | | | | (F/cc) | (F/g) |
| 1 | 4 | —CH$_3$ | 544 | 1.29 (s, 12H), 4.45 (q, 4H), 6.14 (s, 4H), 6.77 (s, 4H), 8.53 (s, 8H) | N.E. | 0.38 | 10 | 0.8 | 0.8 |
| 2 | 4 | 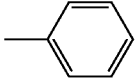 | 792 | 5.52~5.63 (m, 4H), 6.11~6.96 (m, 24H), 8.43~8.54 (m, 8H) | N.E. | 0.36 | 10 | 0.9 | 0.9 |
| 3 | 4 | 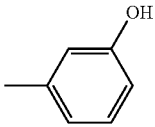 | 856 | 5.47~5.52 (m, 4H), 5.85~6.79 (m, 28H), 8.43~8.45 (m, 8H), 8.63~8.70 (m, 4H) | N.E. | 0.27 | 10 | 1.3 | 1.7 |
| 4 | | Resorcinol-Formaldehyde-Resin | | | 4 | 2.29 | 30 | 7.4 | 22.5 |

TABLE 4

| Constant Current Value | Electric Double-layer Capacitor | |
|---|---|---|
| (mA/g) | (A) | (B) |
| 1000 | 98% | 97% |
| 2000 | 97% | 98% |
| 4000 | 87% | 98% |
| 8000 | 79% | 89% |

The electrode used was an electrode prepared with the same activated carbon obtained in Example 3.

The electrolytic solution of the (A): 1 mole/L of the propylene carbonate solution of tetraethylammonium $BF_4$ salt (organic-base electrolyte)

Production Example of the Resorcin-Formaldehyde Resin and the Activated Carbon Thereof In a reactor, 33.0 g of resorcinol, 48.7 g of 37% by weight of formalin, 0.03 g of sodium carbonate, and g of distilled water were mixed, the mixture was kept at 50° C. for 24 hours to obtain an organic aerogel moistened with water.

The obtained gel was washed with t-butylalcohol to replace the water contained therein with the t-butylalcohol. The gel replaced with the t-butylalcohol was subjected to lyophilization at −30° C. for 24 hours under vacuum, calcined at 1000° C. under argon atmosphere, and then activated at 1000° C. for 4 hours under carbon dioxide to obtain an activated carbon. The pore volume of the activated carbon obtained was 2.39 ml/g.

INDUSTRIAL APPLICABILITY

The activated carbon of the present invention can be used, for example, to an electrode for dry batteries, redox capacitors, hybrid capacitors, electric double-layer capacitors, and the like; among of them, suitably used to an electrode of electric double-layer capacitors due to enhanced electrostatic capacity thereof.

The electric double-layer capacitor of the present invention can be utilized for storage of energy source. Due to the enhanced properties thereof, it can be particularly used for storing energy source in the fields such as portable electric terminals and transportation vehicles characterized by battery-powered driving force.

What is claimed is:

1. An activated carbon comprising a carbonized and activated compound represented by the formula (1):

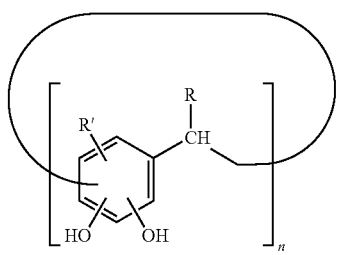

(1)

(wherein, R represents a hydrocarbon group having 1 to 12 carbon atoms, said hydrocarbon group may be optionally substituted with hydroxyl group, alkyl group, alkoxy group, aryl group, aryloxy group, sulfonyl group, halogen atoms, nitro group, thioalkyl group, cyano group, carboxyl group, amino group or amide group, R' represents hydrogen atom or methyl group, and n represents an integer of 4, 6, or 8, and wherein the activated carbon has a total pore volume of less than 0.95 ml/g.

2. The activated carbon according to claim 1, wherein R' of the compound (1) is hydrogen atom.

3. The activated carbon according to claim 1, wherein the activated carbon has an alkali metal component or alkaline earth metal component in the amount of 100 ppm or less.

4. A method for producing an activated carbon comprising carbonizing and activating the compound represented by the formula (1) according to claim 1.

5. The method according to claim 4, wherein said carbonization and activation comprise calcining at a temperature of 200 to 1500° C. in the presence of an oxidative gas.

6. The method according to claim 4, wherein said carbonization and activation comprise calcining at a temperature of 200 to 1500° C. under an atmosphere of an inactive gas to carbon, and then further calcining at a temperature of 200 to 1500° C. in the presence of an oxidative gas.

7. The method according to claim 4, wherein said carbonization and activation comprise calcining at 400° C. or less in the presence of an oxidative gas, calcining at 1500° C. or less under an atmosphere of an inactive gas to carbon, and then further calcining at 200 to 1500° C. in the presence of $H_2O$ or $CO_2$.

8. An electrode comprising the activated carbon according to claim 1.

9. The electrode according to claim 8, wherein R' of the compound (1) is hydrogen atom.

10. The electrode according to claim 8, wherein the activated carbon has an alkali metal component or alkaline earth metal component in the amount of 100 ppm or less.

11. An electric double-layer capacitor comprising the electrode according to claim 8.

12. The electric double-layer capacitor according to claim 11 further comprising a separator and an electrolytic solution.

13. The electric double-layer capacitor according to claim 12, wherein the separator is at least one selected from the group consisting of papermakings, electrolytic papers, kraft papers, manila papers, mixed papermakings, polyethylene non-woven fabrics, polypropylene non-woven fabrics, polyester non-woven fabrics, Manila hemp sheets and glass fiber sheets.

14. The electric double-layer capacitor according to claim 12, wherein the electrolytic solution is an aqueous solution of sulfuric acid.

15. The electric double-layer capacitor according to claim 12, wherein the electrolytic solution comprises an organic quaternary cation, an inorganic anion and an organic polar solvent.

* * * * *